(12) United States Patent
Larsen

(10) Patent No.: US 6,895,893 B2
(45) Date of Patent: *May 24, 2005

(54) BREEDING CONTROL SYSTEM FOR FREE-RANGE ANIMALS

(75) Inventor: Jesper Kristoffer Larsen, Daugård (DK)

(73) Assignee: Kristopher Larsen Innovation A/S (DK)

( * ) Notice: Subject to any disclaimer, the term of this patent is extended or adjusted under 35 U.S.C. 154(b) by 0 days.

This patent is subject to a terminal disclaimer.

(21) Appl. No.: 10/705,636

(22) Filed: Nov. 10, 2003

(65) Prior Publication Data

US 2004/0103847 A1 Jun. 3, 2004

Related U.S. Application Data

(63) Continuation of application No. 10/069,885, filed as application No. PCT/DK00/00485 on Sep. 4, 2000, now Pat. No. 6,659,039.

(30) Foreign Application Priority Data

Sep. 2, 1999 (DK) .......................... 1999 01233
Mar. 2, 2000 (DK) .......................... 2000 00343

(51) Int. Cl.[7] ................................................. A01K 5/02
(52) U.S. Cl. .................................................. 119/51.02
(58) Field of Search ................... 119/51.01, 51.02, 119/51.11, 51.12, 51.5

(56) References Cited

U.S. PATENT DOCUMENTS

| | | | | |
|---|---|---|---|---|
| 3,180,321 A | * | 4/1965 | Aldinger .................. | 119/51.01 |
| 3,929,277 A | * | 12/1975 | Byrne et al. ................ | 235/376 |
| 4,461,240 A | * | 7/1984 | Ostler ...................... | 119/51.02 |
| 4,463,706 A | * | 8/1984 | Meister et al. ........... | 119/51.02 |
| 4,498,424 A | * | 2/1985 | Leuschner ................. | 119/57.2 |
| 4,517,923 A | * | 5/1985 | Palmer .................... | 119/51.02 |
| 4,532,892 A | * | 8/1985 | Kuzara .................... | 119/51.02 |
| 4,589,372 A | * | 5/1986 | Smith ...................... | 119/51.02 |
| 5,174,244 A | * | 12/1992 | Gaalswyk ................ | 119/51.01 |
| 5,309,864 A | * | 5/1994 | Harmsen et al. ......... | 119/51.02 |
| 5,355,833 A | * | 10/1994 | Legrain ................... | 119/51.02 |
| 5,579,719 A | * | 12/1996 | Hoff et al. ............... | 119/51.02 |
| 5,673,647 A | * | 10/1997 | Pratt ....................... | 119/51.02 |
| 6,082,304 A | * | 7/2000 | Crain ....................... | 119/421 |
| 6,664,897 B2 | * | 12/2003 | Pape et al. ............... | 340/573.3 |

FOREIGN PATENT DOCUMENTS

| | | |
|---|---|---|
| DE | 3623816 A1 | 1/1987 |
| DE | 3701864 A1 | 8/1988 |

(Continued)

OTHER PUBLICATIONS

Dell.com homepage dated Oct. 07, 1997. (www.web.archive.org/web/19971007225928/http://www.dell.com.*

(Continued)

Primary Examiner—Teri Pham Luu
Assistant Examiner—Kimberly S Smith
(74) Attorney, Agent, or Firm—Santangelo Law Offices P.C.

(57) ABSTRACT

A method for automatic control of breeding of free-range animals is disclosed, wherein the feed consumed by each individual animal is uniquely identified and registered to enable full traceability between animals or products and the feed. In particular, the present method comprise active and automatic control of the living conditions of the animals based on the monitored and recorded data so that a minimal amount of human interaction is required in the normal operation of a breeding system controlled by use of the method. The invention further relates to a controlled system, typically comprising a general-purpose computer having a suitable computer program installed thereon, for controlling the operation of a breeding system according to the present method.

43 Claims, 28 Drawing Sheets

FOREIGN PATENT DOCUMENTS

Figure 1:
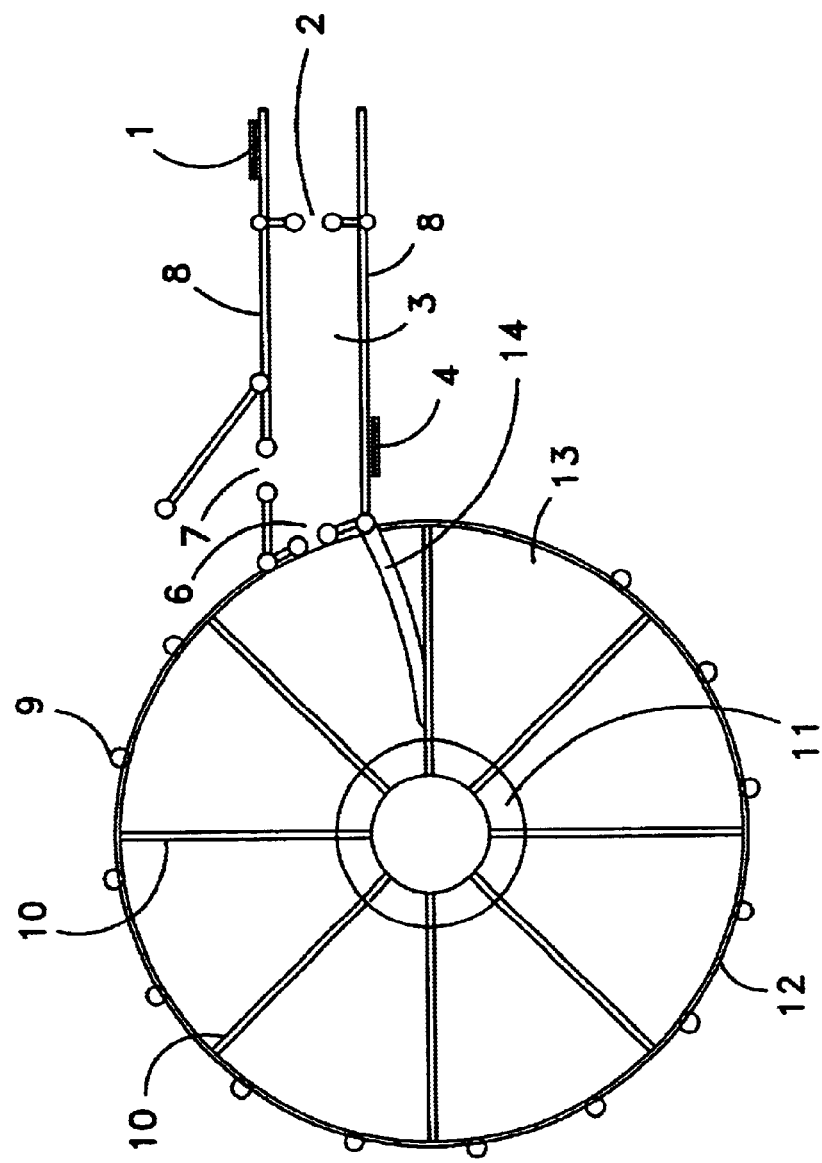

| | | |
|---|---|---|
| DE | 19521570 A1 | 1/1997 |
| EP | 0657098 A1 | 6/1995 |
| FI | 930961 | 9/1994 |
| FR | 2507776 | 12/1982 |
| FR | 2623688 | 6/1989 |
| GB | 2190767 A | 11/1987 |
| GB | 2220834 A | 1/1990 |
| GB | 2232053 A | 12/1990 |
| WO | WO 84/01688 | 5/1984 |
| WO | WO 91/10358 | 7/1991 |
| WO | WO 96/00003 | 1/1996 |
| WO | WO 97/47187 | 12/1997 |
| WO | WO 98/39475 A2 | 9/1998 |
| WO | WO 98/47351 | 10/1998 |
| WO | WO 99/45761 A1 | 9/1999 |

OTHER PUBLICATIONS

U.S. National Phase Patent Application No. 10/069,885 filed Jun. 3, 2002 entitled, "Method for Controlling Breeding of Free–Range Animals."

International PCT application no. PCT/DK00/00485, filed Sep. 4, 2000 entitled, "Method for Controlling Breeding of Free–Range Animals," publication number WO 01/17340 A1.

* cited by examiner

```
                                                  ALL FEED COMPONENTS
                                                  ARE REGISTERED INCLUDING
                                                  ORIGINS, SUPPLIER, FEEDING
                         FEED ─────────────────── VALUE, SHELF LIFE, GMO
                                                  STATUS, ENVIRONMENTAL
                                                  STATUS

BREEDING/CORE            DOCUMENTATION OF THE
         TRACEABILITY ─── MANAGEMENT ──────────── BREEDING MATERIAL

MONITORING OF THE        ALL EQUIPMENT IS MONI-
                         FEEDING ROBOTS           TORED ALL 24 HOURS,
                         AND OTHER ────────────── DEFECTS ARE CORRECTED
                         EQUIPMENT                AND POSSIBLE MANUAL
                                                  INTERVENTION IS CO-
                                                  ORDINATED

COMMUNICATION BETWEEN THE
                                                  FEEDING ROBOTS, MMI AND
                         COMMUNICATION ────────── THE USER TAKES PLACE VIA
                                                  PUBLIC NETS AND WIRELESS.

CLOSED DATABASE STRUCTURE,
                                                  INQUIRIES ARE ANSWERED VIA
         MACHINE         DATABASE DESIGN ──────── PREDETERMINED REPORTS
         MANAGEMENT                               AND THAT ORDERED OVER THE
         INTERFACE                                INTERNET.

METHOD FOR
CONTROLLING
THE FEEDING
OF FREE
RANGE ANIMALS
```

Fig. 18d

| METHOD FOR CONTROLLING THE FEEDING OF FREE RANGE ANIMALS | ELECTRONIC CARE | CONTROLLED FEEDING OF THE INDIVIDUAL ANIMAL | 1 FEEDING KEY IS APPLIED AT A MINIMUM. |
|---|---|---|---|
| | | CONTROL OF THE DOSED AMOUNT OF WATER FOR THE INDIVIDUAL ANIMAL | THE AMOUNT OF WATER IS COMPARED WITH NUMBERS OF EXPERIENCE BASED ON TEMPERATURE, WIND SPEED, HUMIDITY OF THE ATMOSPHERE, THE ANIMAL'S AGE, WEIGHT AND RACE. |
| | | REGISTERING OF DATA | THE FOLLOWING DATA ARE REGISTERED REGULARLY: WEIGHT, TEMPERATURE, TIME, WATER CONSUMPTION, STRESS MANAGEMENT, BLOOD PRESSURE, PUPILS, ATTENDANCE CONTROL, SILHOUETTE PHOTOGRAPHING, FAT SCANNING AND MATING CONTROL BY MEANS OF AN ELECTRONIC NOSE. |
| | | STOCK CHECK | MONITORING OF THE STOCK AND AUTOMATIC REORDERING OF A.O.: FEED, MEDICINE, AND WATER. |

Fig. 18e

| | | SEPARATION OF THE INDIVIDUAL ANIMAL | FOR SLAUGHTERING, FOR OBSERVATION FOR ILLNESS, SORTING-OUT TAKES PLACE AUTOMATICALLY FROM THE REGISTERED DATA. |
|---|---|---|---|
| METHOD FOR CONTROLLING THE FEEDING OF FREE RANGE ANIMALS | ELECTRONIC CARE | IDENTIFICATION OF THE INDIVIDUAL ANIMAL | THE IDENTITY OF THE ANIMAL IS MAINTAINED BY ONE OR MORE OF THE FOLLOWING: BAR CODE, TRANSPONDER, SOUND, IRIS ANALYSIS, TATTOOING AND SMELL. |
| | | CONTROL OF IN-TAKE OF FEEDING | BY MEANS OF IMAGE RECOGNITION POSSIBLE REMAINS IN THE FEEDING TROUGH ARE CONTROLLED AND EVALUATED AFTER THE ANIMAL HAS LEFT THE FEEDING ROBOT. |
| | | MIXING THE FEED | THE FEED CAN BE MIXED BOTH IN RESPECT OF TYPE (SOY MEAL, SPECIES OF GRAIN, TURNIPS) AND WEIGHT CONDITIONS. VITAMINS AND AMINO ACIDS MAY BE ADDED. |

Fig. 18f

US 6,895,893 B2

BREEDING CONTROL SYSTEM FOR FREE-RANGE ANIMALS

This application is a continuation of application Ser. No. 10/069,885, filed Jun. 3, 2002, now U.S. Pat. No. 6,659,039, which is the National Stage of International Application No. PCT/DK00/00485, filed Sep. 4, 2000, which claims priority from Danish application no. PA 2000 00343, filed Mar. 2, 2000 and Denmark application no. PA 1999 0233, filed Sep. 2, 1999.

The present invention relates to a method for automatic control of breeding of free-range animals, in particular porkers and other animals bred for meat production, wherein the feed consumed by each individual animal is identified and registered to that the feeding of each animal may be traced so that quality parameters of products derived from the animals can be established and/or so as to identify animals that have been given feed from a particular batch of feed that subsequently has been discovered to comprise impurities or contamination. In particular, the present method may comprise active and automatic control of the living conditions of the animals based on the monitored and recorded data so that a minimal amount of human interaction is required in the normal operation of a breeding system controlled by use of the method. The invention further relates to a control system, typically comprising a general-purpose computer having a suitable computer program installed thereon, for controlling the operation of a breeding system according to the present method.

BACKGROUND OF THE INVENTION

A steadily increasing demand exists for animal products, such as meat and milk, of which the consumers can obtain knowledge with respect to the breeding conditions of the animals from which the products origin, the breeding conditions being understood in a broad sense and including a lot of details relating, e.g., to feeding of the animals and their general well-being. Furthermore, it is of interest to the farmers to handle the animals individually, especially with respect to feeding, so that the most efficient and economical breeding is performed. This handling should however be as automated as possible since the cost of human labour is steadily increasing in most of the world.

A number of arrangements for individual control of animals are known from the prior art in particular for pigs, for cattle and for milch cows.

One apparatus for automatic, individual feeding of animals is disclosed in DE 37 01 864 in which the animals are weighted and/or identified at one station from which each animal is selectively lead to one of a plurality of individual feeding pens, is lead back to the stock if they have been fed or is lead to a separation area by means of moving or turning the weighting/identification station between the different destinations. The identification of the animals is made by means of an identification tag fastened to each animal and the amount of feed in the feeding pens is measured out for the individual animal.

U.S. Pat. No. 4,517,923 discloses an automatic animal feeding system, in particular for cows, in which the animals are fed individually upon identification of the animal from automatically reading of an identification tag attached to each of the animals. The amount of feed provided to the animal is based on information collected about each animal, such as the animals weight. The animal may be weighted manually where after the weight is entered into the control system, or the animals may be weighted automatically on a commonly accessible scale which periodically measured the weight of the animal, on scales provided in the feeding pens or on scales provided in the parlour stalls.

U.S. Pat. No. 5,673,647 relates to an automated method and system for providing individual animal electronic identification, measurement and value based management of cattle in a large cattle feedlot. Animals are individually identified and measured by weight, external dimensions and characteristics of internal body tissue. The individual identification and registration of the cattle with respect to physical and other information is used for calculating the optimal time for slaughtering. There is no mentioning of an individual feeding of the cattle or feeding means and the cattle are fed directly on the ground in the herd.

U.S. Pat. No. 5,355,833 relates to a computer controlled equipment for breeding of calves and other animals, comprising means for identification and weighing of each animal, computation of amount and composition of feed from the weight, the increase in weight, thickness of fat layer, temperature etc.

German Patent Application DE 3 623 816 relates to an equipment in which the animals are weighted and an amount of feed is computed according to the individual weight and weight gain of the animal and the feed ratio is dispersed and registered.

Several other patents and patent applications relates to controlled breeding of animals, such as F1 930 961, GB 2 190 767, GB 2 220 834, GB 2 232 053, DE 195 21 570, FR 2 507 776, FR 2 623 688, EP 0 657 098, WO 84/01688, WO 91/10358, WO 96/00003, WO 98/47351, WO 97/47187, WO 98/39475, U.S. Pat. No. 4,461,240, U.S. Pat. No. 4,463,706, U.S. Pat. No. 4,532,892, U.S. Pat. No. 3,180,321, U.S. Pat. No. 4,498,424, U.S. Pat. No. 4,589,372, U.S. Pat. No. 5,309,864 and U.S. Pat. No. 5,579,719.

However, none of the above identified references include the tracing between each individual animal and thereby the potential products derived therefrom and the identification of the particular feed being fed to said individual animals.

DESCRIPTION OF THE INVENTION

By the use of the present invention, detailed knowledge of the conditions for the individual animal may be provided to the consumers, primarily relating to feeding and type of feed, such as organically grown feed, genetically modified feed, absence of animal food in feed for herbivores etc., conditions relating to health, such as cases of illness, intake of medicine within a given period etc. Furthermore, the method of the present invention provides the condition that the well-being of the individual animal is constantly monitored so that no animal will show behaviour or other characteristics indicating illness or other deviation from the normal well-being for a longer period without action is taken to change the condition of the animal.

It is an object of the present invention to provide a method for breeding of animals in which a precise and traceable identification of the feed consumed by the animal is registered and kept on record, preferably during the lifetime of the animal, so that a well documented product from the animals may be provided.

It is a further object of the invention to provide a method in which the monitored and recorded characteristics are used to actively control the conditions for the animal, including feeding of the animals as well as selection of the animals for slaughtering, for further breeding, for medical treatment, etc.

One of the advantages of the present invention relates to the possibility of identifying and separating one or more animals for slaughtering or other purposes based on a selection of data on the animals which may be incorporated into the computer program.

In one embodiment, a number of animals such as pigs are separated at a specific time based on a number of criteria or characteristics such as one or more of the following weight, fat content, health (duration from last medication, absence of fever), and age. The separation of the desired number of animals may then be performed at a given time such as a planned transportation to the slaughterhouse. If the desired number is not available, the system may set a number of alternative criteria or ranges to secure that the desired number of animals are separated.

In a further embodiment, the characteristics which are used for separating the animal include registration of conditions relating to stress such as the stress symptoms including pulse, blood pressure and registration of a dilation of the eye pupil, all parameters is compared with a basic value registered and recorded on each animal. Any of these factors may be registered and stored at any desired time according to the control system of the present invention. The specific registration is preferable performed in connection with the registration of the individual animal in the automatic feeding unit, or in connection with weighting or if desired, the animal may regularly be separated for the specific detection of any of such features.

In a still further embodiment, the method of controlling according to the present invention involves recording of data relevant for the individual animal suitability for breeding in addition to the basic recording of the parent. These data include a recording of number of piglets delivered by the sow, the weight of the piglets and other health parameters. Accordingly, the computer program may identify the optimal parent animals for breeding in accordance with the situation and circumstances wherein which the animals should live, such as the climate, available food, stress factors in addition to factors relating to health, weight gain in relation to food intake, etc.

In a still further embodiment, animals which has been genetically engineered for the purpose of organ delivery for transplantation into humans may be monitored and controlled according to the present invention.

In addition, a product arising from the animal such as milk may in the further production and handling be followed by a recording allowing identification of the animal delivering the product at a later stage. In one embodiment, the meat arising for the animal is registered and followed by an identification which e.g. in case of contaminated meat allows identification of the individual animal as well as the entire herd. It will also be possible to identify other products which has been in any contact or possible contact with the contaminated product during the handling procedure.

Animals which has been genetically engineered for delivering a product with a specific quality such as a human hormone excreted in the milk may be subject to a concrete surveillance according to the invention in that weight, temperature, health parameters and behaviour is registered and monitored for the individual animal.

The advantage of the present invention relates to the fact that it will be possible to breed a large number of animals with a minimal man capacity. At the same time it is possible to diminish loss of feed and furthermore, the breeding may be adapted to one or more specific desired qualities of the product without increasing cost or work. In other words, the system allow e.g. the breeding of animals with different fat content to be breed together and also to feed a selected number of animals with a selected food. The breeding may also be performed during circumstances securing the overall welfare of the animal.

DETAILED DESCRIPTION OF THE INVENTION

According to the main aspect, the present invention relates to a method for controlling breeding of animals of a herd comprising for each animal the repeated series of steps of automatic identification of an individual animal by means of identification means controlled by means of a control unit to which an output significant of the identity of the animal is communicated from the identification means, dispersing feed to the identified animal by means of feed dispersing means of an automatic feeding unit controlled by means of the control unit, and adding data concerning the feeding of the identified animal to a record pertaining to said animal and storing said record on data storage means associated with the control unit, the data concerning the feeding of the identified animal comprises data suitable for unique identification of the batch/batches of feed from which the feed dispersed to the animal is taken. Thereby a unique link between each animal and the specific batches of feed is established from which a tracing between animals and feed is enabled.

These data suitable for unique identification of the feed dispersed to the animal may be used for establishing a link between an animal or a product derived from an animal, such as meat or milk, to an identified source of feed. This feature implies several advantages. It enables that the consumer can obtain data relating to the content of the feed given to the animal, such as e.g. a possible content of genetically modified plant products, animal products such as meat-and-bone meal, plant products that have been treated with pesticides or straw-shortening agents, etc. The feature further enables the establishment of a link from a source of feed containing unwanted or harmful components to animals or products from animals that have been fed the feed in question as well as a link from an animal or a product that have been demonstrated to contain such component to a limited sources of feed, from which the contaminated feed may be identified and a link from the feed to animals and products may be established. The unique identification of the batch of feed may be the code used commonly comprising a 12 number identification of the content of the batch plus a 4 number identification of the batch itself. This identification may be combined with the storage of a sample of each batch as described below.

Thus, the method may further comprise the steps of identifying from said records which batches a given animal have consumed feed from, retrieving from data storage means information about the constituents of each of the batches of feed from which a given animal have consumed feed from, and producing an output accordingly. This output may comprise a detailed list of components and their absolute of relative share of the total amount of feed consumed by the animal, the output may information about the components, whether they are e.g. organically grown, are genetically modified or any other information that may be of interest to consumers or others.

Alternatively or additionally, the link between animals and batches of feed may be used to trace animals that have been fed a given batch of feed, and the method may comprise the steps of identifying from a unique identification of a batch of feed the animals of the herd which have consumed feed from said batch, and producing an output accordingly.

In a further embodiment of the present invention, the data suitable for unique identification of the batch/batches of feed from which the feed dispersed to the animal is taken are being added to a record pertaining to the identified animal for substantially all food being fed to the animal during a period corresponding substantially to the lifetime of the animal and substantially all of the data added to the record pertaining to each of the animals are kept in the record at least during said period. The adding of data to the records may also include data from monitoring of characteristics of the animal as described below and also be performed during a period corresponding substantially to the lifetime of the animal and substantially all of the data added to the record pertaining to each of the animals are kept in the record at least during said period. In addition, the monitoring may be continued for a product obtained from the animal allowing a control back in time and subsequent identification of an animal giving rise to a product of high quality or in other cases the identification of an animal which produces a product with inferior quality. Based on the record of the animal it is possible to study possible factors and conditions relevant for the final product depending on the intended use of the product, i.e. consumption, breeding, veterinarian or human medical research, etc.

Each record may alternatively or additionally comprises data relating to the identity of the mother of the individual animal, said data being suitable for enabling unique identification of feed dispersed to the mother during the pregnancy period to be retrieved. Thereby, the above-mentioned links may be established for the indirect feed consumption of the animals in the embryonic stage.

The linking between animal and batches of feed may in a preferred embodiment be extended to comprise a linking between products derived from the animals and the batches of feed. Thus, the method may further comprise the steps of determining by means of product identification means a unique animal identification of products derived from animals of the herd, and searching and retrieving from data storage means a record pertaining to the animal from which the product was derived in accordance with the determined unique animal identification, the record comprising data suitable for unique identification of batches of feed from which feed dispersed to the animal have been taken.

As it is increasingly important to have a safe identification on an animal and as the genetic technology now allows easy test for an animals DNA profile, the method may involve a record comprising data being significant for the DNA of the animal to which the record pertains so that each animal may be positively linked to the record pertaining to said animal by means of said data. Thus, the method may further comprise the steps of determining unique animal identification data by means of analysing the DNA of a sample taken from an animal of the herd or from a product derived from an animal from the herd, and searching and retrieving from data storage means a record pertaining to the animal in accordance with the determined unique animal identification data, the record comprising data suitable for unique identification of batches of feed from which feed dispersed to the animal have been taken.

In order to achieve a more detailed monitoring of the animals and for use e.g. in separation of animals from the herd, the data concerning the feeding of the individual animal may comprises data concerning the time at which the animal is fed.

The method according to the invention may furthermore comprise the steps of monitoring characteristics of each individual animal by regularly, automatically detection of said characteristics by means of detection means controlled by means of a control unit to which the detection means communicate an output signal being significant for the detected characteristics, the detection being accompanied by an automatic identification of the individual animal by means of identification means controlled by means of the control unit to which an output significant of the identity of the animal is communicated from the identification means, said characteristics comprising at least the weight of the animal, and adding said output from the detection means into a record pertaining to the individual animal, the record being selected by the control unit from a plurality of records comprised within a data storage means of said control unit by use of the output from the identification means, and storing of said record in the data storage means by means of said control unit.

In a further embodiment the method additionally comprises the steps of computing a feed ration for each individual animal by means of the control unit based on data comprised within the record of said animal and on a set of standard data comprised in the data storage means, the control of the automatic feeding unit by means of the control unit to disperse feed to the identified animal being according to the computed feed ration. Data about the dispersed feed ration is stored in the record pertaining to the animal. The computed feed ration may comprise a mixture of at least two types of feed and the feed dispersing means disperses according to the method said mixture accordingly.

In an important aspect of the invention, the method is a method wherein the feeding unit comprises detection means for detecting a possible amount of feed that was not consumed by the animal to which it was dispersed and for communicating data being significant of said amount to the control unit, said data being added to the record pertaining to said animal. Advantageously, the detection means may comprise a camera for producing an image of the feeding bowl after the animal has left is and a computer programme for determining the potential amount of non-consumed feed from the image.

Such a system has proven to require less maintenance than a weighing unit in the feeding bowl. It is detected that the animal has not finished the full amount of feed, the amount may be decreased for the next feeding whereas the amount of feed may be increased if the animal empties the bowl. The feeding is thereby adjusted to optimise the growth rate for the individual animal from weaning to slaughtering. The collected data may also be used for computation of the E value discussed below and for monitoring of the well being of the animal.

The characteristics to be monitored according to the present invention may according to the invention relates to the step of monitoring of at least one of the following characteristics.

a) a temperature of the animal, b) a thickness of the fat layer on the back of the animal, and c) an image representing at least a part of the body of the animal, the at least one characteristics being detected by suitable detection means controlled by means of the control unit to which the detection means communicates an output signal being significant for the detected characteristics, the method further comprising the step of adding said output from the detection means into the record pertaining to the identified animal. The images may be used for identification of the animals, for classification purposes, surveillance of the well-being and/or for veterinarian or human medical research purposes.

In case stress factors is relevant the method comprises the monitoring of at least one of the following characteristics relating to the stress level of the animal.

d) the respiration rate of the animal,
e) the heart beat rate of the animal,
f) the blood pressure of the animal, and
g) an image of an eye of the animal, the at least one characteristics being detected by suitable detection means controlled by means of the control unit to which the detection means communicates an output signal being significant for the detected characteristics, the method further comprising the step of comparison of the output signal with a standard value of said output comprised within the storage means by means of the control unit and the step of adding the outcome of said comparison into the record pertaining to the identified animal. The standard value of said output for each of the animals may be comprised within the record pertaining to the animal. The image of the eye of an animal may also be used for unique identification purposes.

In a further aspect, the temperature of each animal is monitored, and the method further comprising the steps of determining whether the detected temperature deviates from a predetermined reference temperature range by means of the control unit, and separating the animal by means of the separation unit in case of deviation.

Due to the fact that feeding is an important and economical relevant factor in breeding, the method according to the invention may further comprise the step of on a regular basis computing the E value, being the weight unit growth per consumed weight unit of feed, for each animal by means of the control unit using data comprised within the record pertaining to the animal. This will enable the breeder to identify an animal which for some reason is having an unusual growth curve, whether desirable or non desirable. Accordingly, in a preferred embodiment, the invention relates to a method further comprising the steps of determining for each animal whether the computed E value deviates from a predetermined set of E value ranges by means of the control unit, and separating the animal by means of a separation unit controlled by means of the control unit in case of deviation.

The calculation of E values may also be utilised for, on a regular basis, computing statistical values of weight unit growth per consumed weight unit of a given feed (E value) for a plurality of the animals by means of the control unit using data comprised within the record pertaining to each of said plurality of animals so as to provide a measure of the quality of the given feed and thereby evaluate the quality e.g. in order to adjust the feeding rations and/or to monitor changes in the quality. It is preferred in order to make the calculation of the E value as precise as possible that the dispersed amount of feed is weighted before it is fed to the animal instead of relying on the precision of the dispersing means, such as a screw conveyor. With a large number of systems for breeding of animals according to the present method and using a vast number of different types of feed, it will be possible to range the types of feed according to the quality, i.e. the unit growth per unit consumed weight or per unit costs, and having a separate range for each group of animals, such as porkers 20–30 kg of weight, etc. This ranging of the types of feed may according to the invention be prepared and made publicly accessible on a computer system being connected to a public communication network.

In a still more preferred embodiment, the method comprises the steps of determining for each animal whether the consumed amount of feed deviates from a predetermined set of feed consumption ranges by means of the control unit using data comprised within the record pertaining to the animal, and separating the animal by means of the separation unit in case of deviation.

The feed ration for each animal may also be adjusted by means of the control unit according to the detected temperature and optionally to the wind speed the animals are subjected to. This is due to he fact that the temperature of the environment is relevant for the energy each animal will need.

It is a general advantage if the breeding system is arranged to perform automatic separation of a subgroup of animals from the herd for the purpose of e.g. slaughtering, for medical treatment, etc. Thus, the method may further comprise the steps of selecting a subgroup of the herd of animals, said subgroup comprising at least one animal, by means of the control unit, the selection being based on data comprised within the records of each animal and on a set of selection data comprised in the data storage means, and controlling an automatic separation unit by means of the control unit, wherein each animal belonging to said subgroup is automatically identified by means of identification means controlled by means of the control unit and is separated to a separation enclosure.

The control unit may preferable at least temporarily connected to a data communication network which it is able to communicate with at least one remote system. The remote system may be a surveillance system from which the operation of the control unit may be remotely monitored and at least partially controlled. The communication between the control unit may be via private data communication means, public data communication means such as telephone lines, it may be by wire or wireless, or any combination of data communication means and networks. The communication is preferably established as a two-way communication.

The method may also comprise the step of issuing a warning information requesting external interaction by means of the control unit in case at least one condition of a list of conditions is fulfilled, the list of conditions comprising at least the following conditions.

a) at least one of the animals has not entered a feeding unit within a predetermined time period, and b) the power supply to the breeding system controlled by the control unit is interrupted.

In a further aspect, the feeding unit comprises feed storage means and monitoring means for monitoring the content of the storage means and communicating to the control unit accordingly, the list of conditions further comprising one or more of the following conditions.

c) the remaining supply of feed in the feed storage means is below a predetermined threshold value.
d) the pressure in the supply of compressed air to the breeding system is below a predetermined threshold value,
e) the pressure in the supply of drinking water to the breeding system is below a predetermined threshold value, and
f) a malfunction of one of the elements of the breeding system being controlled by means of the control unit is detected, and alternatively or additionally,
g) at least one of the animals has not approached a drinking water bowl a within a predetermined time period.

The warning may be issued for any other monitored characteristic of the animal or any other malfunction of the system, such as erroneous function of the weighing means, of gates, of turning of carrousel, etc. The operation of the system may furthermore be monitored by cameras producing images from which a malfunction of the system may be detected automatically by image analysis. The analysis may be performed in the control unit or in a remote surveillance system.

In a preferred embodiment, the warning information is issued to a remote system by means of the data communication network.

Use of medicine in the breeding is of increasing interest in that resistance and leftover of medicine in the products of the animal should be avoided. Accordingly, control of the feeding unit may further comprise the step of controlling medicine dispersing means of the feeding unit in accordance with medicine dispersing data stored within the record pertaining to the identified animal in the feeding unit so that the animal is being provided with a predetermined ration of medicine, the data concerning the dispersing of medicine is added to said record.

The invention also relates to a method wherein a subgroup is selected to be in accordance with a separation order communicated to the control unit, the separation order comprising data relating to the number of animals to be separated and to at least one quality to be fulfilled by the selected animals, the at least one quality being selected from a list of qualities comprising the following quality:

a) a weight range from which the weight of each of the selected animals do not deviate,
b) a predetermined time period in which medicine has not been dispersed to any of the selected animals,
c) a thickness range from which the thickness of the fat layer on the back of the selected animals should not deviate,
d) a set of E value ranges from which the set of computed E values of the selected animals should not deviate.

In general, the separation is performed in relation to the feeding and the separation order may further comprises data relating to the time at which the separation following the selection is to be accomplished, the separation of animals being performed with consideration to data relating to the times at which the animal is fed comprised in the record of each animal. In addition, animals that are separated for slaughtering are preferable identified and monitored through the procedure of separation, transport to the place of slaughtering and the slaughtering process itself so that the a plurality of times relating to said procedure are monitored for each of the individual animals the times are added to the records pertaining to the respective animals.

A separation order as discussed above may be communicated to the control unit from a computer system being external to the control unit via a public data communication network, and optionally also via a remote surveillance system and the control unit, respectively the remote surveillance system, is in this embodiment adapted to receive such a separation order of a given format and effectuate it automatically. The separation order is typically issued from a slaughterhouse or the like. The separation order comprises in a preferred embodiment a future date of separation and the control unit are adapted to control the breeding so as to aim at fulfilling the at least one quality of the separation order.

Finally, the receipt of a separation order from an external computer system is in a most preferred embodiment followed by the step of issuing an order confirmation from the control unit, optionally from a remote surveillance system, via a public data communication network to the external computer system, said order confirmation comprising information indicating to which extend said separation order may be executed.

Each of the records may further comprise data relating to the identity of the parents of the animal and to the date of birth.

As explained above, animals that are separated for slaughtering may be followed through the slaughtering process as well as the meat processing process so that at least some of the final products originating from the animals can be positively identified as to from which animal the product originates. It is preferred that said identified products are equipped with an identification means by means of which the animal from which the product originates can be identified.

It is thus possible to offer customers to place orders containing detailed specifications for the specific product and to control the production and breeding accordingly. By the tracing of the products and animals made possible be the present system, it is possible for the customer to control that the specifications are fulfilled. An order could comprise the following specifications:

only female pigs, the mothers of which were in free-range during pregnancy, the piglets not weaned until 7th week, raised in open air/on field from 7th week, a constant monitoring of the well-being of the individual animal, no medication given to the animals, no contents of genetically modified components in the feed, no treatment of grain components in the feed with specified pesticides or other specified chemicals, no fertilisation of components of the feed with sludge, specified identity of the persons/companies responsible for the breeding of the animals, maximum transport time between breeding place and slaughterhouse, maximum time between arrival to slaughterhouse and slaughtering, limit for measured stress level (measured from the meat, e.g. the content of halotene), weight range before slaughtering, e.g. 110–112 kg, thickness of fat layer on the back 6–8 mm, maturing of the meat and date of delivery.

Similarly, a request can be made to the control unit or the remote system whether a given number of animals fulfilling a given set of criteria can be separated and delivered at a given date of delivery.

In a still further aspect, the invention relates to a breeding arrangement controlled by use of the method and comprising a mud-hole arranged accessible for the animals, the mudhole having such dimensions that it may contain at least one of said animals and having a design so that said animals are able to enter and leave the mud-hole, the mud-hole comprising detection means for detecting the relative content of one or more components of excreta in a liquid contained within the mud-hole and communicating an output accordingly to the control unit, the control unit comparing the output with a predetermined range stored within the storage means and issuing a warning in case the output deviates from said range. Any warning may be issued to an external system via the communication network.

The above-mentioned methods may comprise a monitoring of the intake of drinking water by the individual animal as well as the time of the water intake, a data recordation accordingly and the issuing of a warning or the separation of an animal if the water intake deviates from a predetermined range. The range may be determined from a number of data, such as the weight, age, race and/or sex of the animal, environmental conditions such as temperature, wind speed and/or humidity, and a deviation from the range may be an early indication of an illness of the animal, typically diarrhoea which may be deadly to the animal if diagnosed late in the course of the disease. The amount of drinking water may also be measured out for each of the animals in the drinking bowl and/or in the feeding bowl.

The present invention relates in a further aspect, that may be regarded as a separate invention that may be combined with any of the previously mentioned steps and features or may be incorporated in the above method, to a method for controlling breeding of animals of a herd comprising for each animal the repeated series of steps of monitoring characteristics of each individual animal by regularly, automatically detection of said characteristics by means of detection means controlled by means of the control unit to which the detection means communicate an output signal being significant for the detected characteristics, the detection being accompanied by an automatic identification of the individual animal by means of identification means controlled by means of the control unit to which an output significant of the identity of the animal is communicated from the identification means, said characteristics comprising at least the weight of the animal, adding said output from the detection means into the record pertaining to the individual animal and storing of said record in the data storage means by means of the control unit, dispersing feed to the identified animal by means of feed dispersing means of an automatic feeding unit controlled by means of the control unit, adding data concerning the feeding of the identified animal to a record pertaining to said animal and storing said record on data storage means associated with the control unit, automatic identification of an individual animal approaching a drinking water bowl by means of identification means of the drinking bowl controlled by means of the control unit to which an output significant of the identity of the animal is communicated from the identification means, monitoring of the amount of water consumed by said animal from the drinking water bowl by means of detection means and communicating an output accordingly to the control unit, and adding said data to the record pertaining to said animal, the animals of the herd being supplied with drinking water from one or more drinking water bowls controlled in the above way so that all consumption of drinking water of each of the animals is monitored and data concerning said consumption are added to the record of each animal.

Thus, according to this aspect, at least the weight and the feeding of the animal is monitored by the control unit as well as the water intake by the animal. Thereby, a full surveillance of the essential characteristics is available for detecting deviations in the well being of the animal. The intake of drinking water may increase or decrease as a function of a number of parameters and with the use of the data relating to feeding and weight, a potential illness of the animal may be detected from the data relating to the intake of water and the necessary measures may be taken. Thus, the method may further comprise the steps of determining for each animal whether the consumed amount of water deviates from a predetermined set of water consumption ranges by means of the control unit using data comprised within the record pertaining to the animal, and separating the animal by means of the separation unit in case of deviation.

Furthermore, the step of separation of the animal is accompanied by the issuance of warning information by means of the control unit.

The present invention relates in a yet further aspect, which may be regarded as a separate invention that may be combined with any of the previously mentioned steps and features or may be incorporated in the above methods, to a method for controlling breeding of animals of a herd comprising selecting by means of a control unit a subgroup of animals from the herd and determining a weight range from which the weight of each of the selected animals should not deviate at a selected future date, the method further comprising for each animal of the selected subgroup the repeated series of steps of monitoring the weight of each individual animal by regularly, automatically detection of the weight by means of weighing means controlled by means of a control unit to which the weighing means communicate an output signal being significant for the detected weight, the detection being accompanied by an automatic identification of the individual animal by means of identification means controlled by means of the control unit to which an output significant of the identity of the animal is communicated from the identification means, adding said output from the weighing means into a record pertaining to the individual animal, the record being selected by the control unit from a plurality of records comprised within a data storage means of said control unit by use of the output from the identification means, and storing of said record in the data storage means by means of said control unit, computing by means of the control unit a feed ration for each individual animal based on data comprised within the record pertaining to said animal, on the selected weight range, and on the selected date, controlling an automatic feeding unit by means of the control unit, wherein each individual animal is automatically identified by means of identification means controlled by means of the control unit and the computed feed ration for the individual animal is dispersed to the animal by means of feed dispersing means controlled by means of the control unit, and adding data concerning the feeding of the individual animal to the record pertaining to said animal.

Thus, the control unit may advantageously base the computation of the feed ration on a predetermined desired weight of the individual animal and a predetermined future date on which date said individual animal is desired to reach said weight, whereby a given number of animals may be ready for separation, e.g. for slaughtering, with a given weight at a given date. The control of the weight may be performed by feeding the animals a larger, respectively a smaller ratio of feed, or it can be performed by changing the composition or mixture of feed for the individual animal. The method may accordingly comprise the steps of

- receiving by means of the control unit a separation order comprising data relating to the number of animals to be separated, to a weight range from which the weight of each of the selected animals should not deviate upon separation, and to a future date of separation,
- performing said selection of a subgroup in accordance with the received separation order, and
- performing by means of separation means controlled by the control unit a separation from the remaining herd of the selected subgroup of animals on said date of separation.

The present invention relates in another yet further aspect, which may be regarded as a separate invention that may be combined with any of the previously mentioned steps and features or may be incorporated in the above methods, to a method for controlling breeding of animals of a herd comprising for each animal the repeated series of steps of

- monitoring characteristics of each individual animal by regularly, automatically detection of said characteristics by means of detection means controlled by means of the control unit to which the detection means communicate an output signal being significant for the detected characteristics, the detection being accompanied by an automatic identification of the individual animal by means of identification means controlled by means of the control unit to which an output significant of the identity of the animal is communicated from the identification means, said characteristics comprising at least the weight of the animal,
- adding said output from the detection means into the record pertaining to the individual animal and storing of said record in the data storage means by means of the control unit,
- dispersing feed to the identified animal by means of feed dispersing means of an automatic feeding unit controlled by means of the control unit,
- detecting by means of electronic image recording means an electronic image being significant of a possible amount of feed that was not consumed by the animal to which it was dispersed and processing said image by means of data processing means to determine said possible amount, and
- adding data concerning the feeding of the identified animal, including said determined possible amount, to a record pertaining to said animal and storing said record on data storage means associated with the control unit.

The present invention relates in a still yet further aspect, which may be regarded as a separate invention that may be combined with any of the previously mentioned steps and features or may be incorporated in the above methods, to a method for remote surveillance of a plurality of breeding systems each for automatic breeding of animals of a separate herd by means of a central surveillance computer system, the method comprises for each of the breeding systems the steps of

- monitoring characteristics of each individual animal by regularly, automatically detection of said characteristics by means of detection means controlled by means of the control unit to which the detection means communicate an output signal being significant for the detected characteristics, the detection being accompanied by an automatic identification of the individual animal by means of identification means controlled by means of the control unit to which an output significant of the identity of the animal is communicated from the identification means, said characteristics comprising at least the weight of the animal,
- adding said output from the detection means into the record pertaining to the individual animal and storing of said record in the data storage means by means of the control unit,
- dispersing feed to the identified animal by means of feed dispersing means of an automatic feeding unit controlled by means of the control unit,
- adding data concerning the feeding of the identified animal to a record pertaining to said animal and storing said record on data storage means associated with the control unit,
- performing a continuous monitoring of the operation of at least parts of the breeding system by means of the control unit, and
- at least temporarily establishing a data communication connection between the control unit and the central surveillance computer system via a data communication network, the method further comprising the steps of comparing the collected data relating to the animals of each of the herds and to the monitoring of the operation of each of the plurality of breeding systems with a set of standard data defining an envelope of normal operation and issuing by means of the central surveillance computer a warning message comprising a request for human interaction with a specified one of the plurality of breeding systems.

Furthermore, the present invention relates to a computer system comprising at least one general purpose computer having one or more computer programs stored within data storage means associated therewith, the computer system being arranged for as well as being adapted for performing the above-described method.

Also, the present invention relates to a computer program product being adapted to enable a computer system comprising at least one general purpose computer having data storage means associated therewith and being arranged suitably to perform the above described method.

SHORT DESCRIPTION OF THE FIGURES

Figure 2:
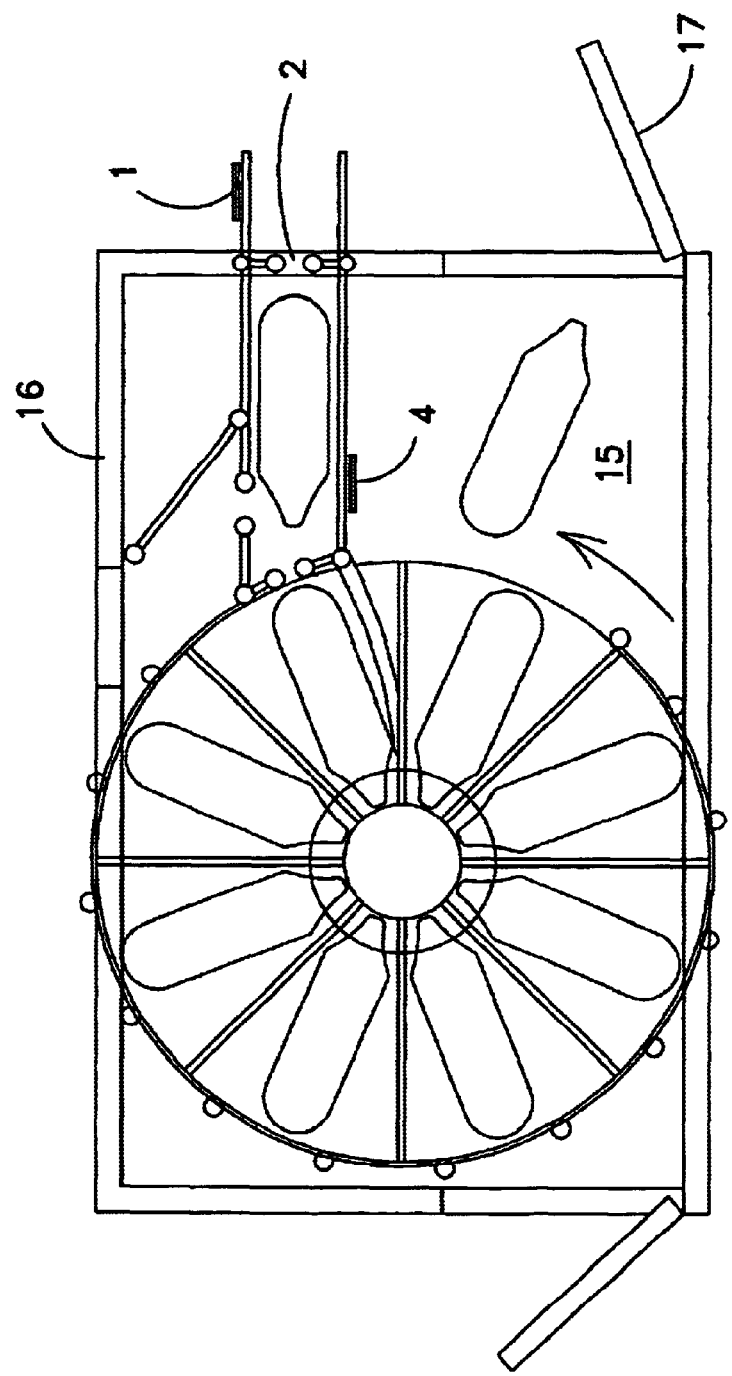
Figure 3:
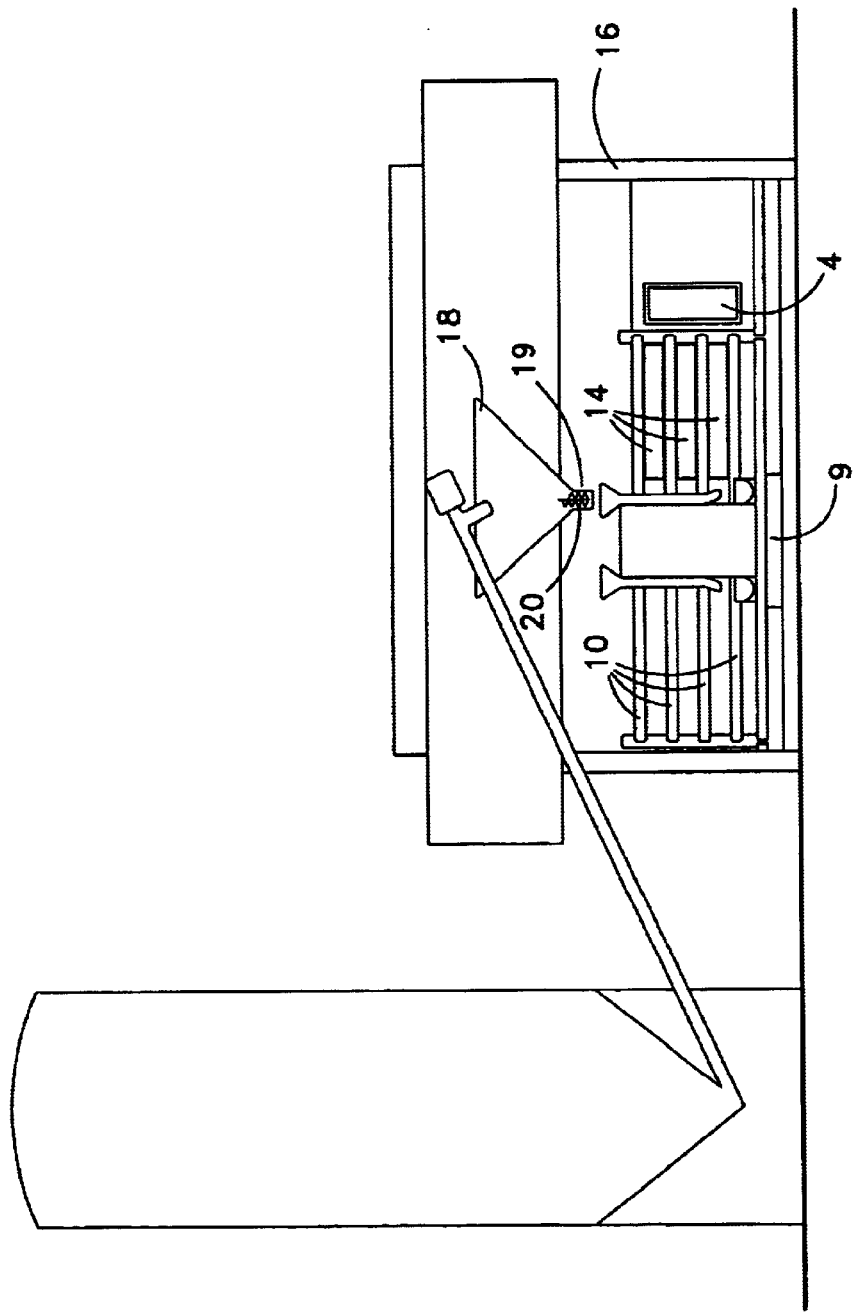
Figure 4A:
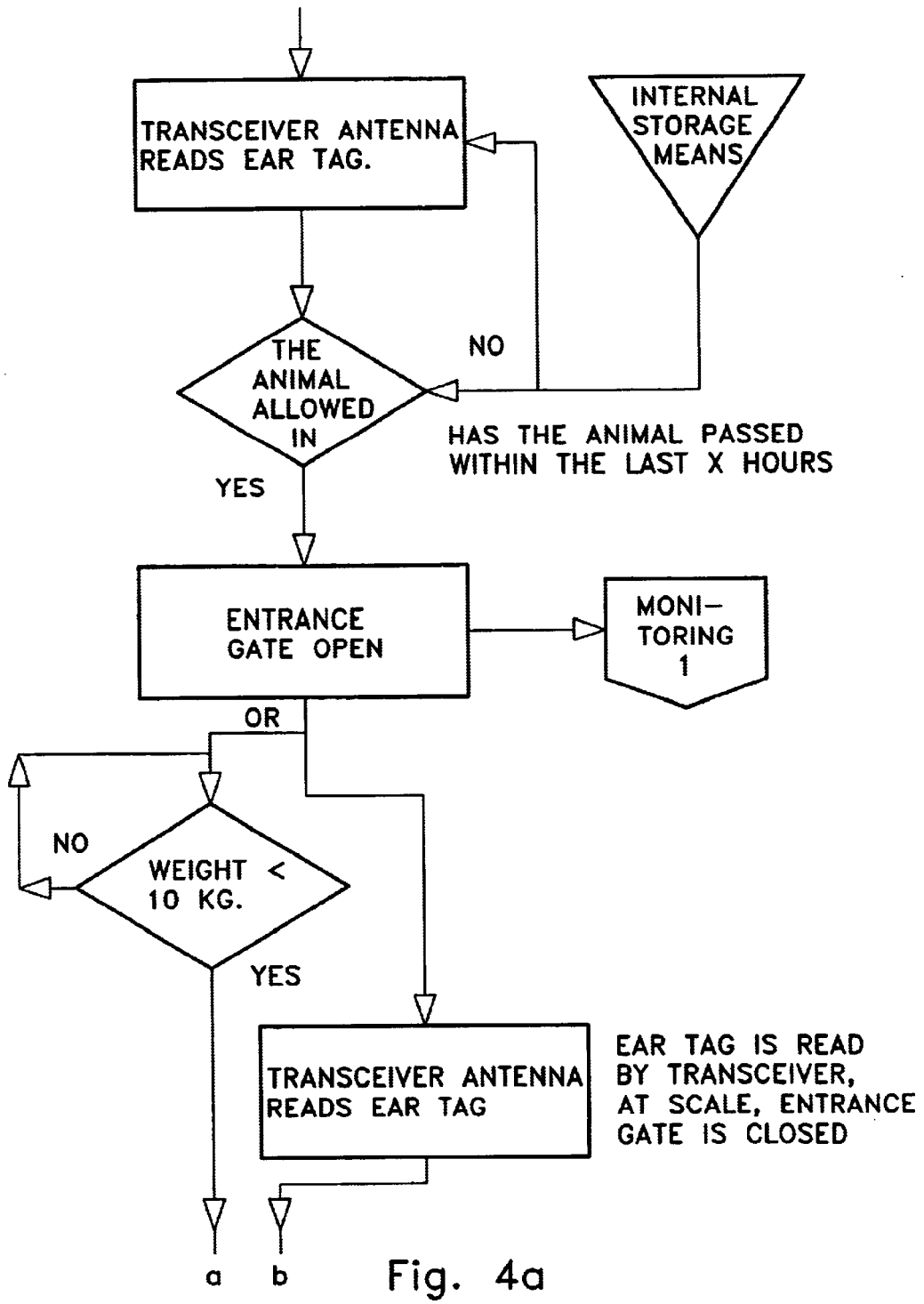
Figure 4B:
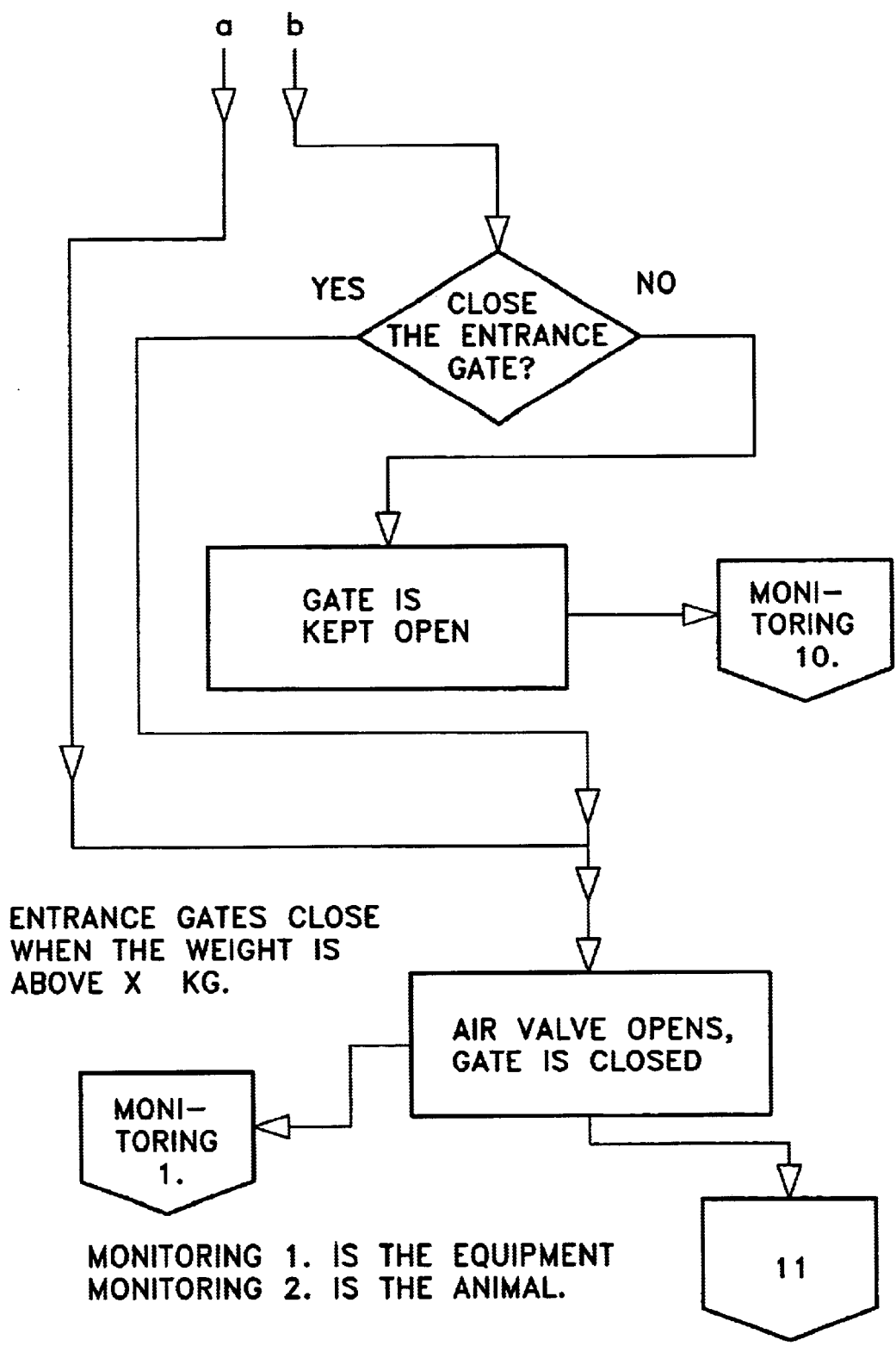
Figure 5:
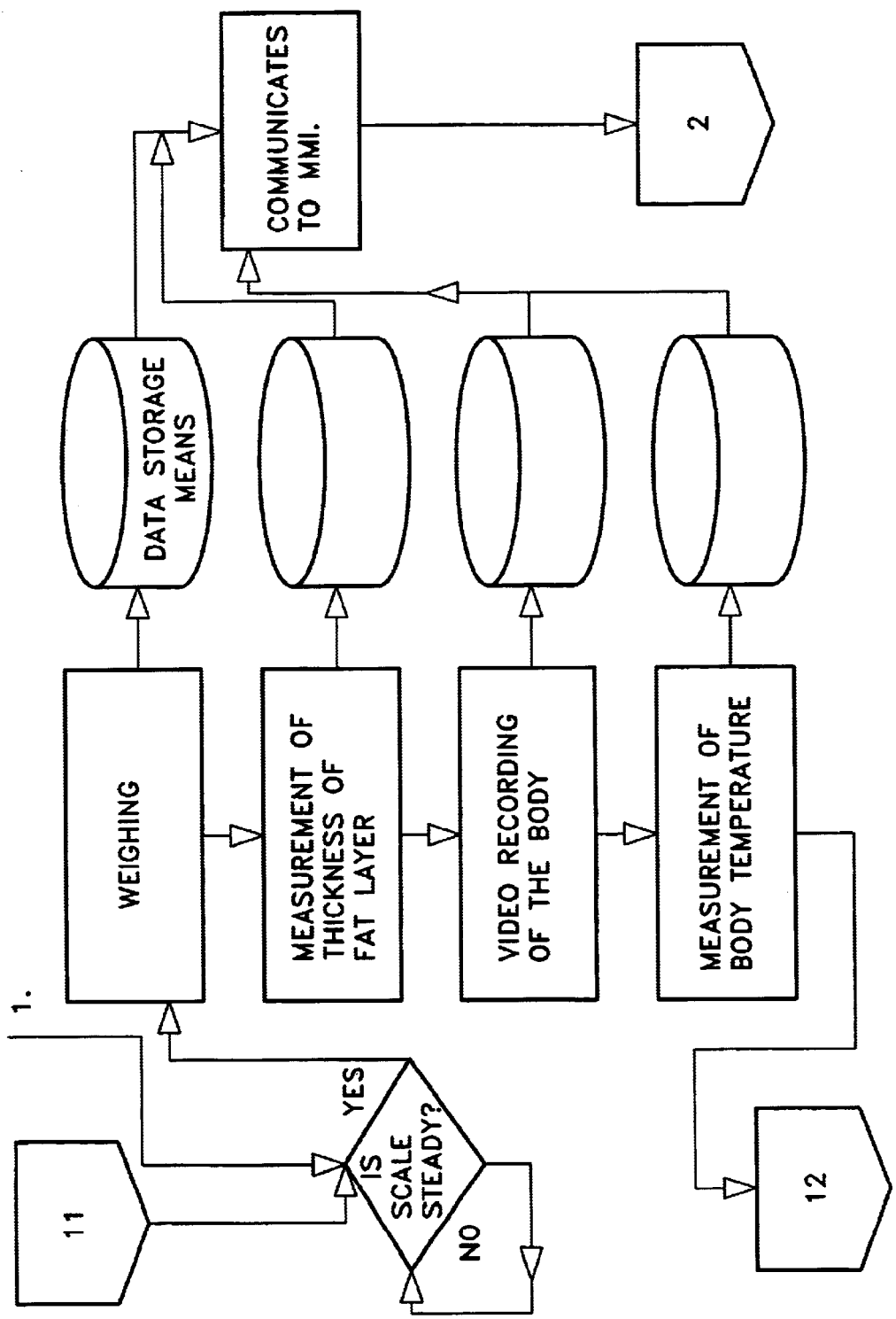
Figure 6A:
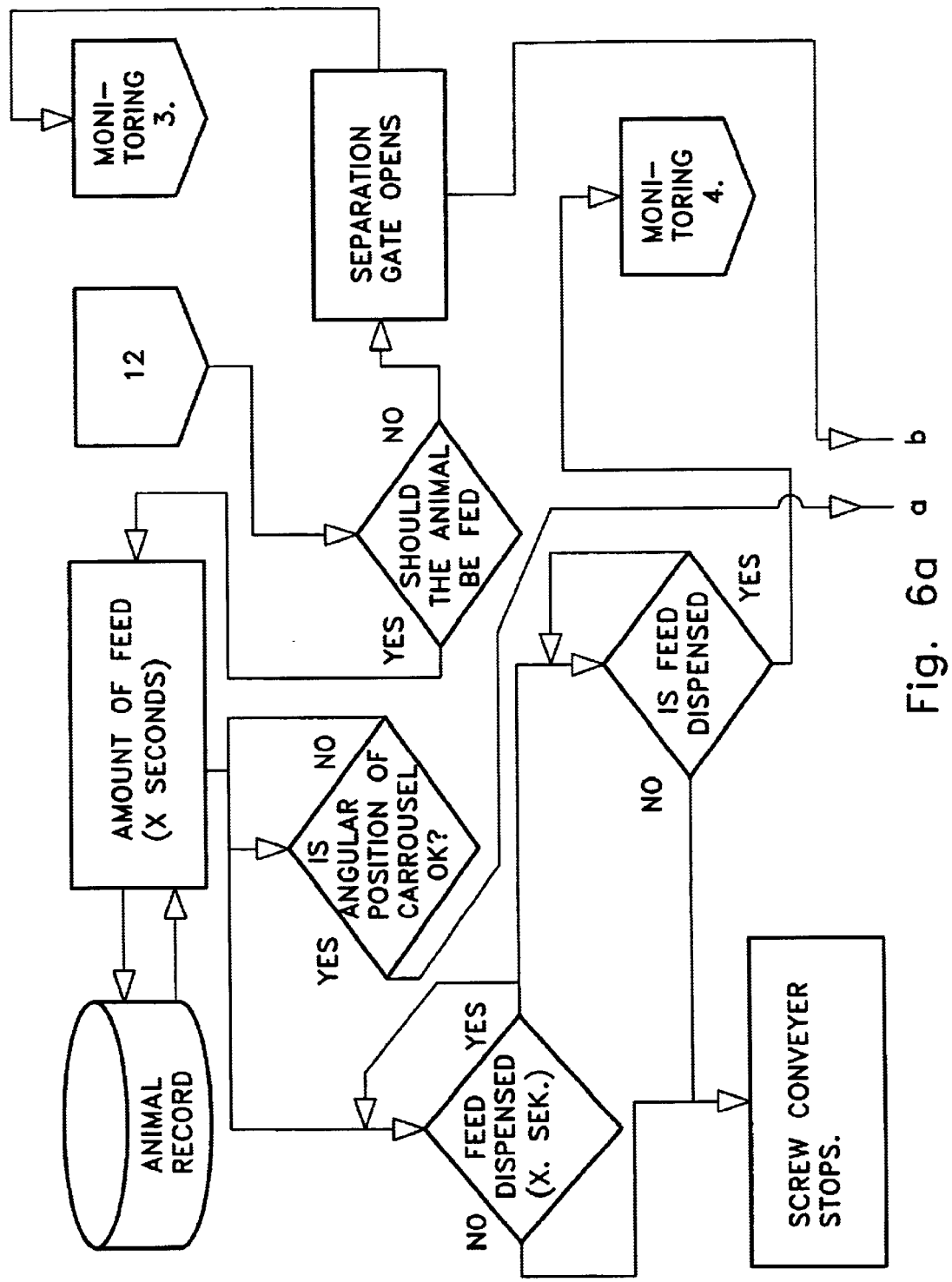
Figure 6B:
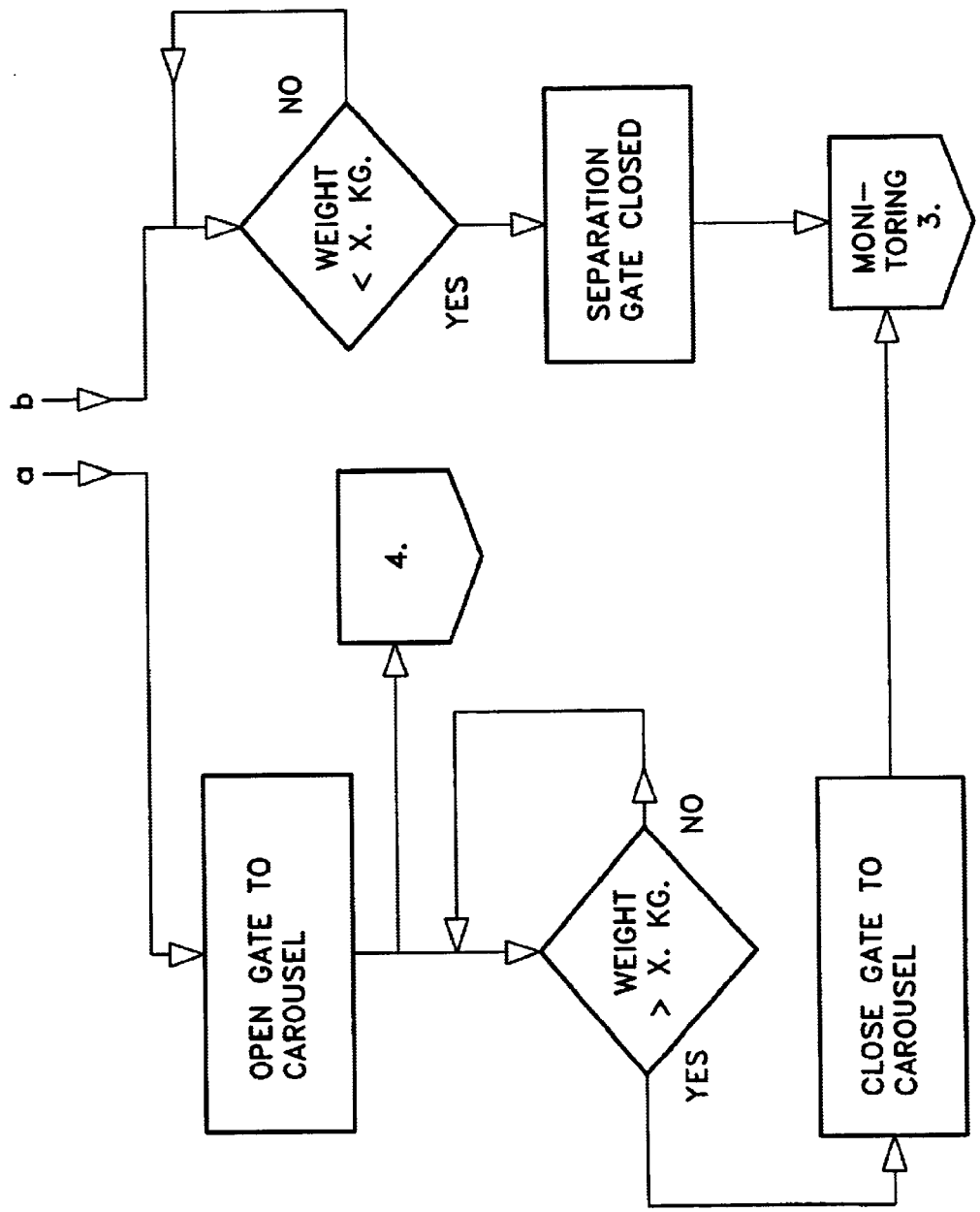
Figure 7:
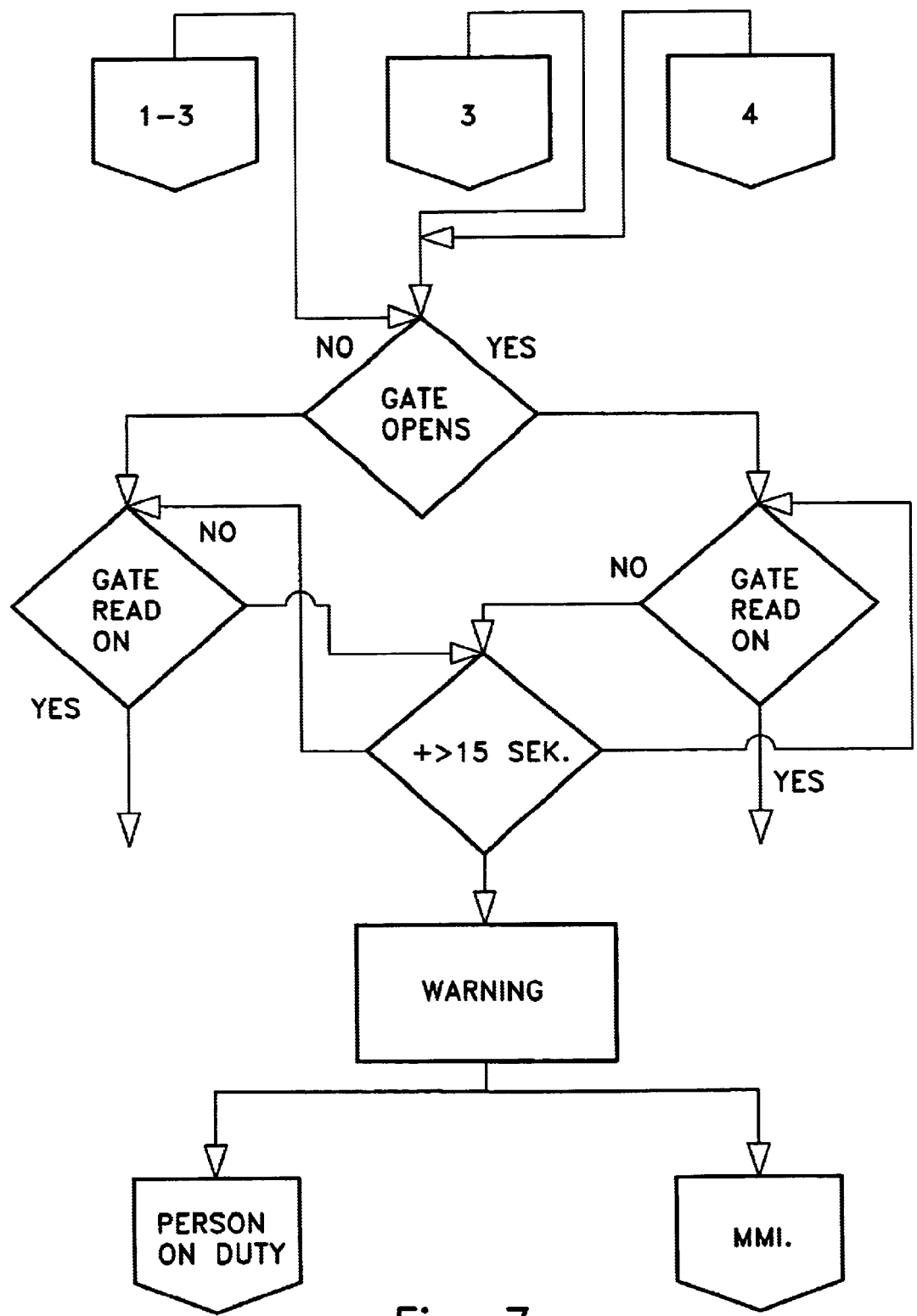
Figure 8:
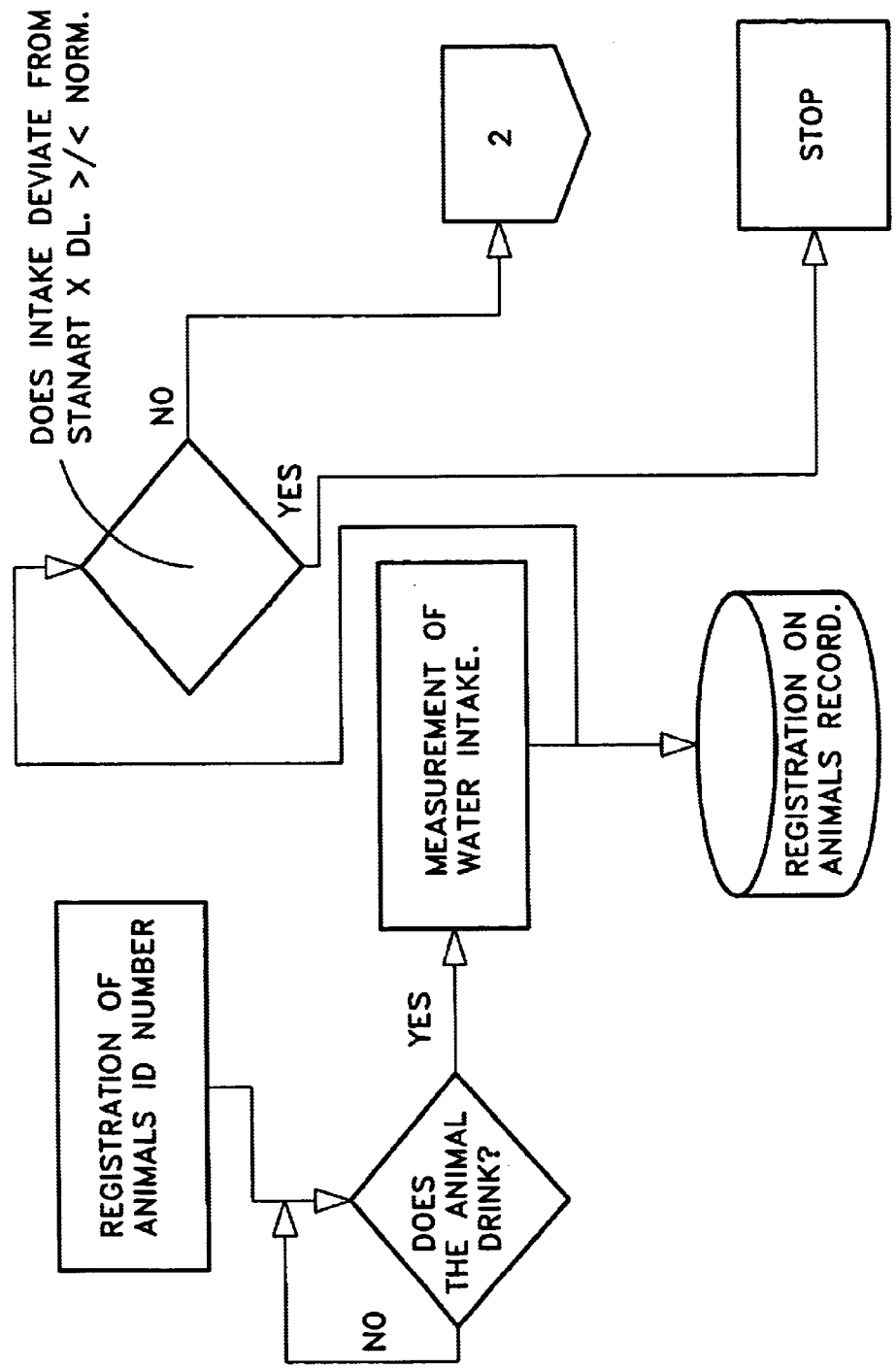
Figure 9:
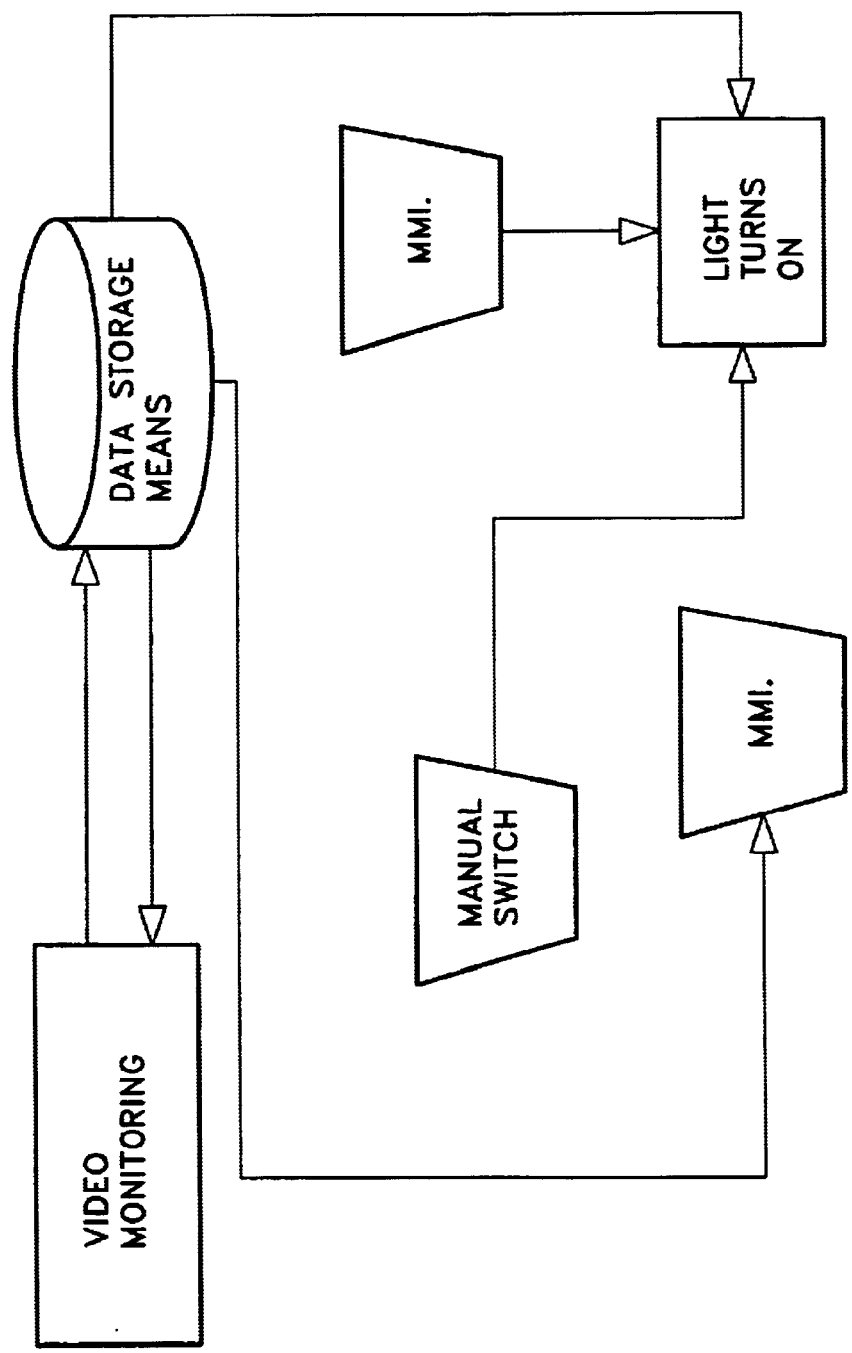
Figure 10:
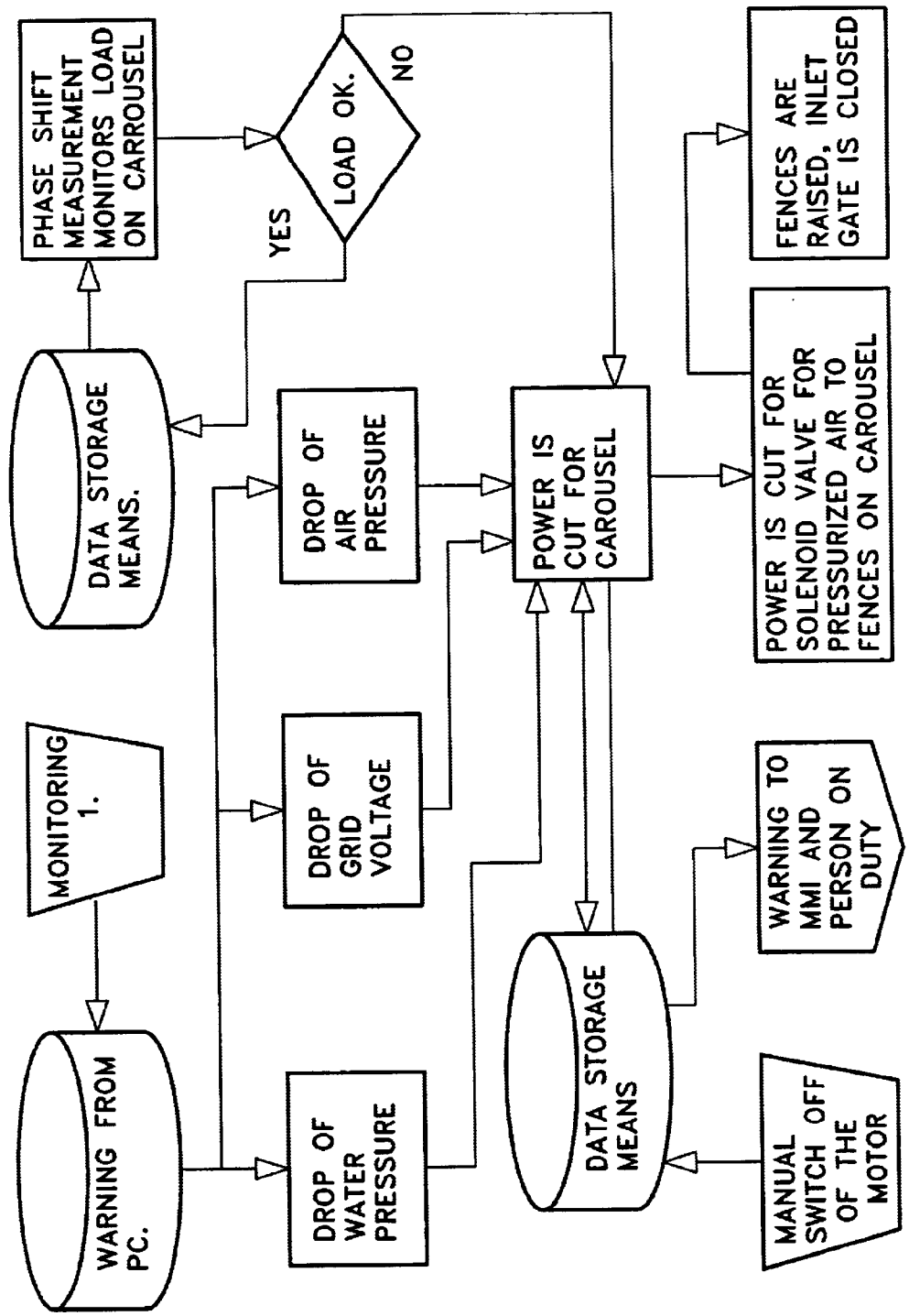
Figure 11A:
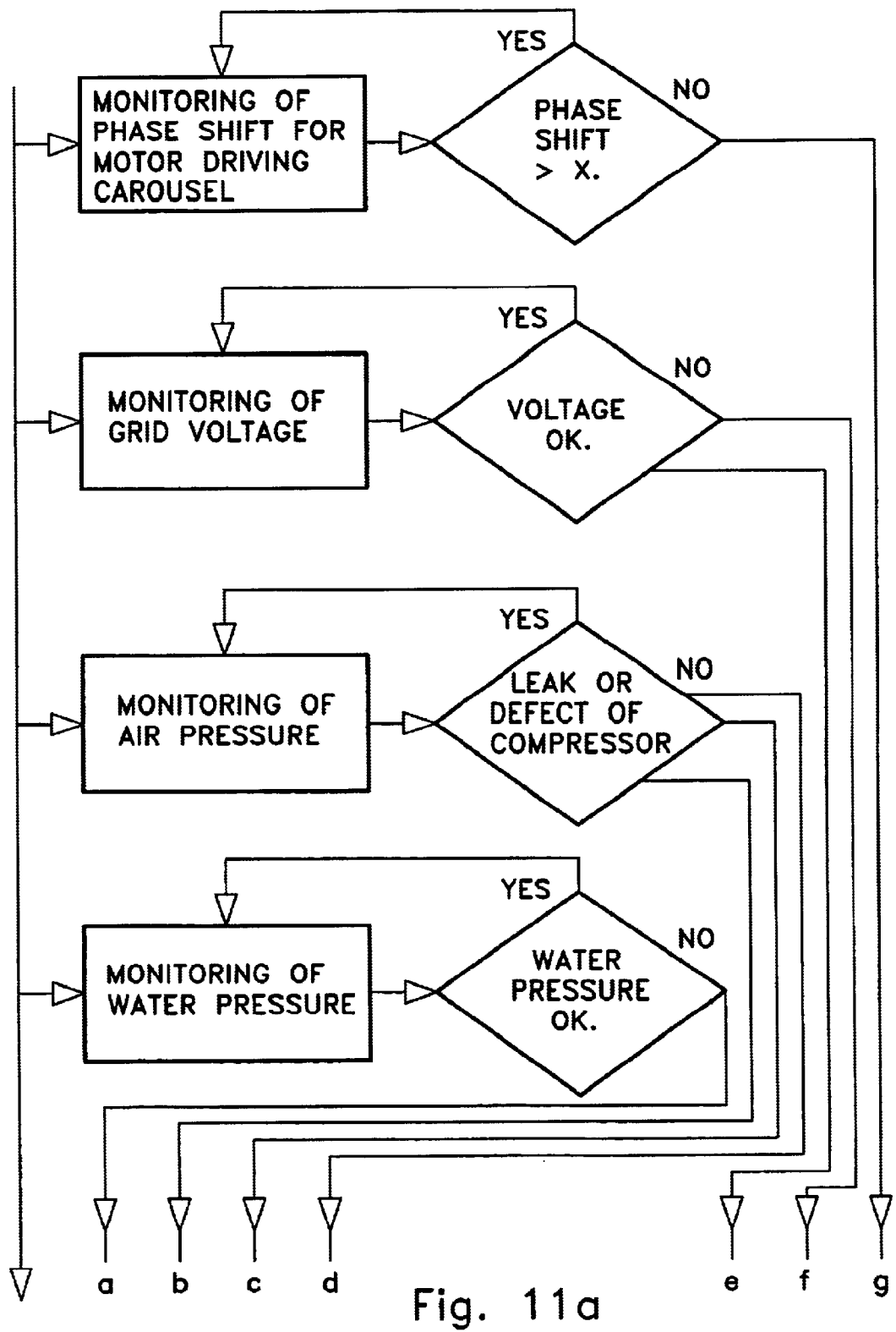
Figure 11B:
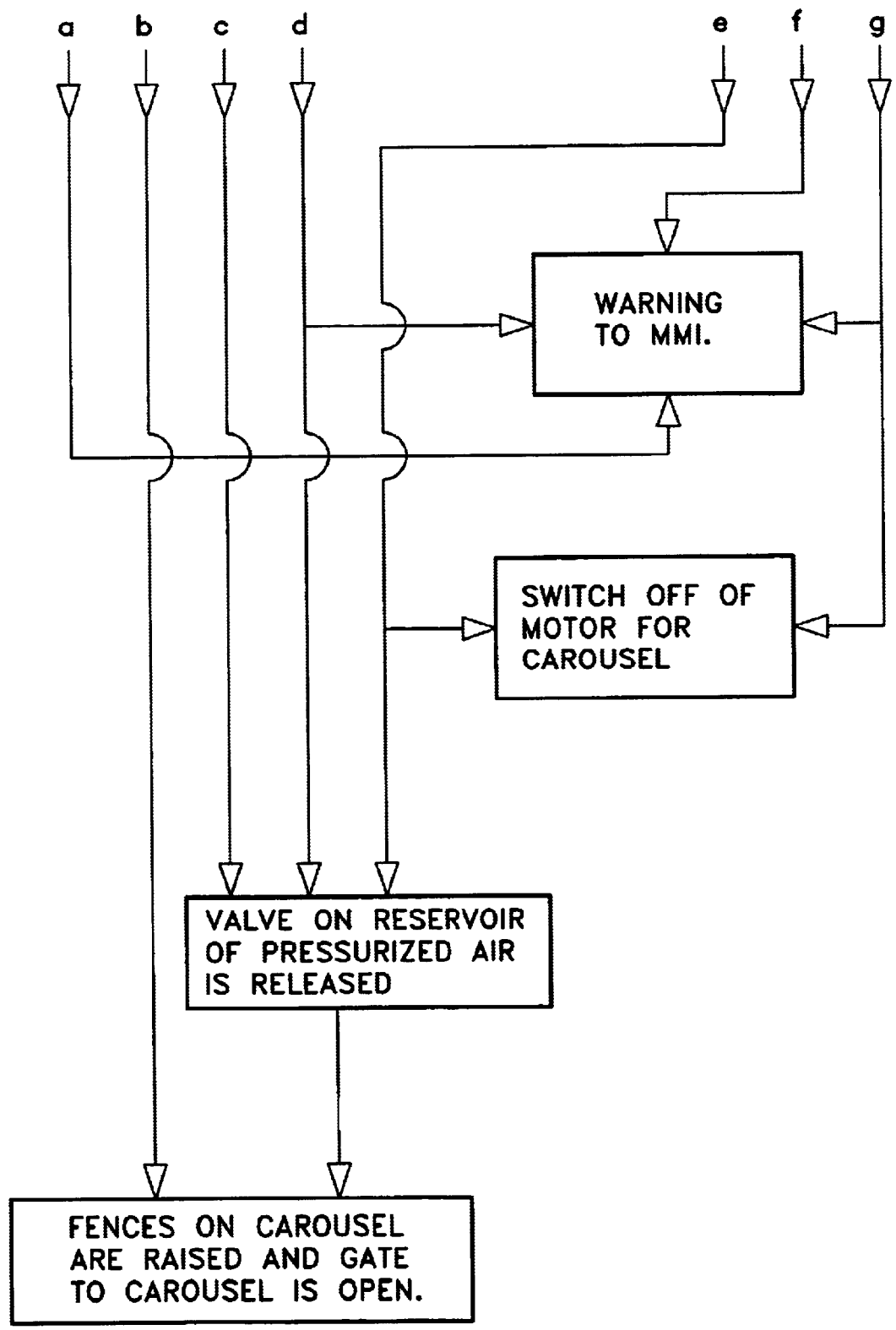
Figure 12A:
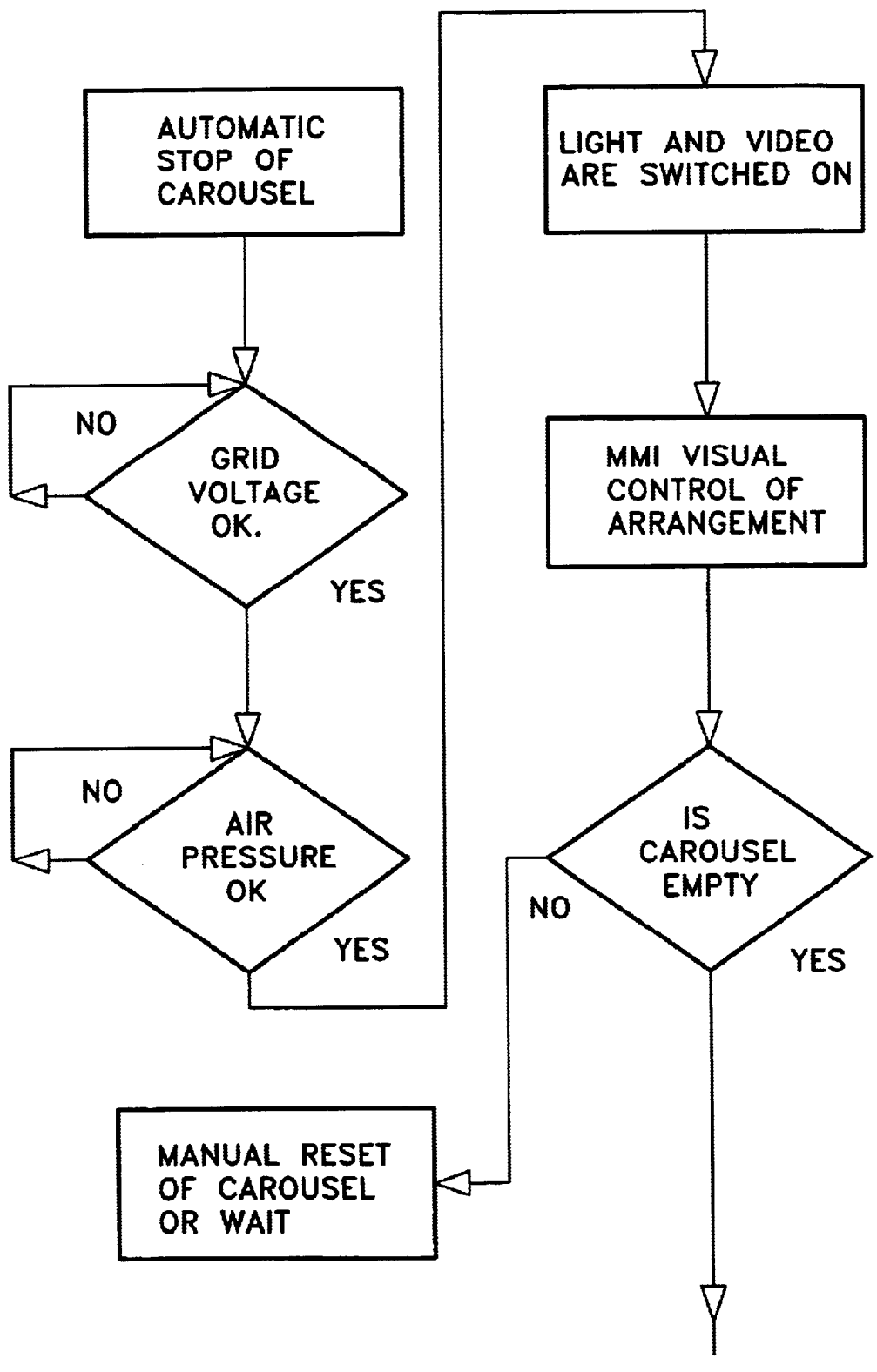
Figure 12B:
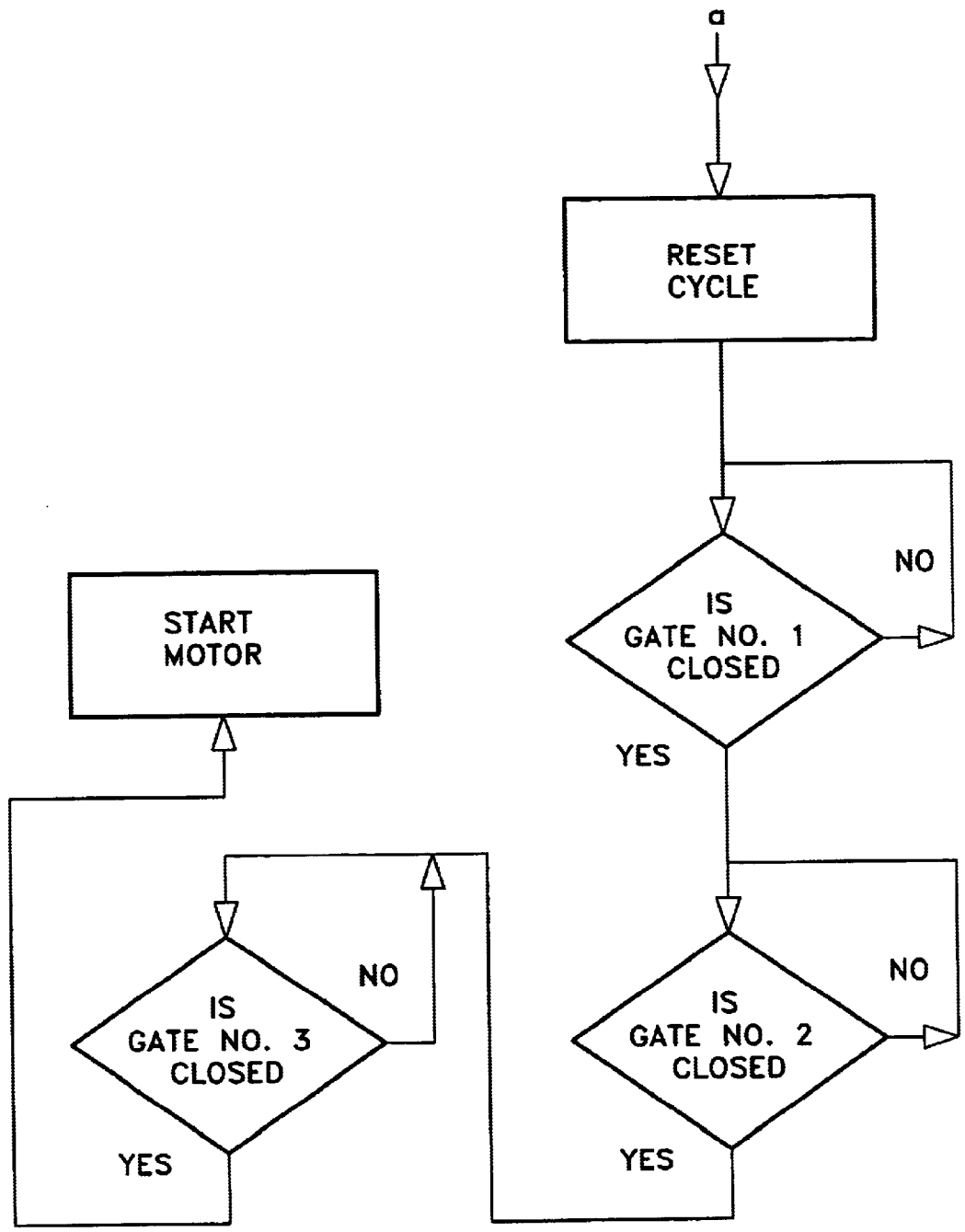
Figure 13A:
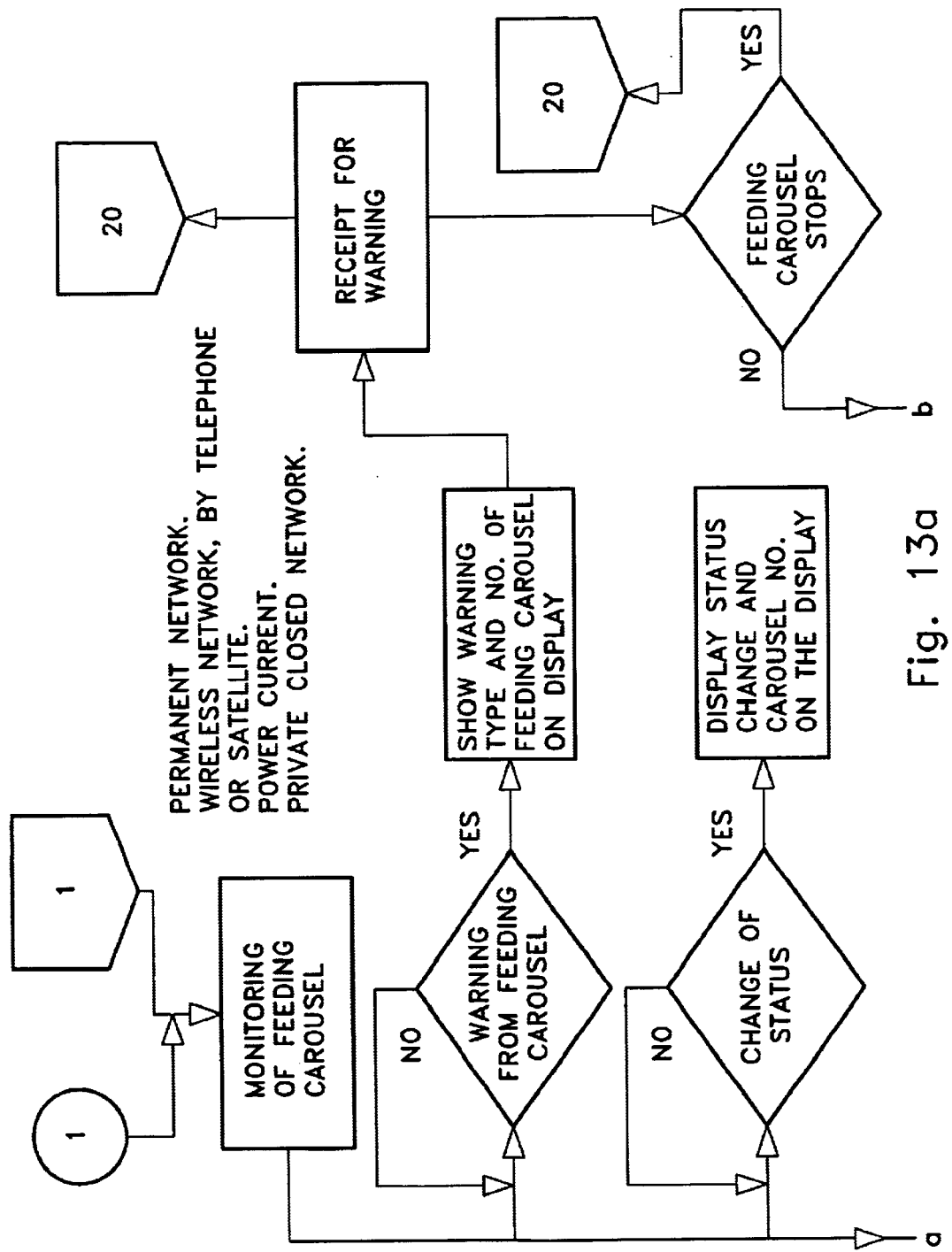
Figure 13B:
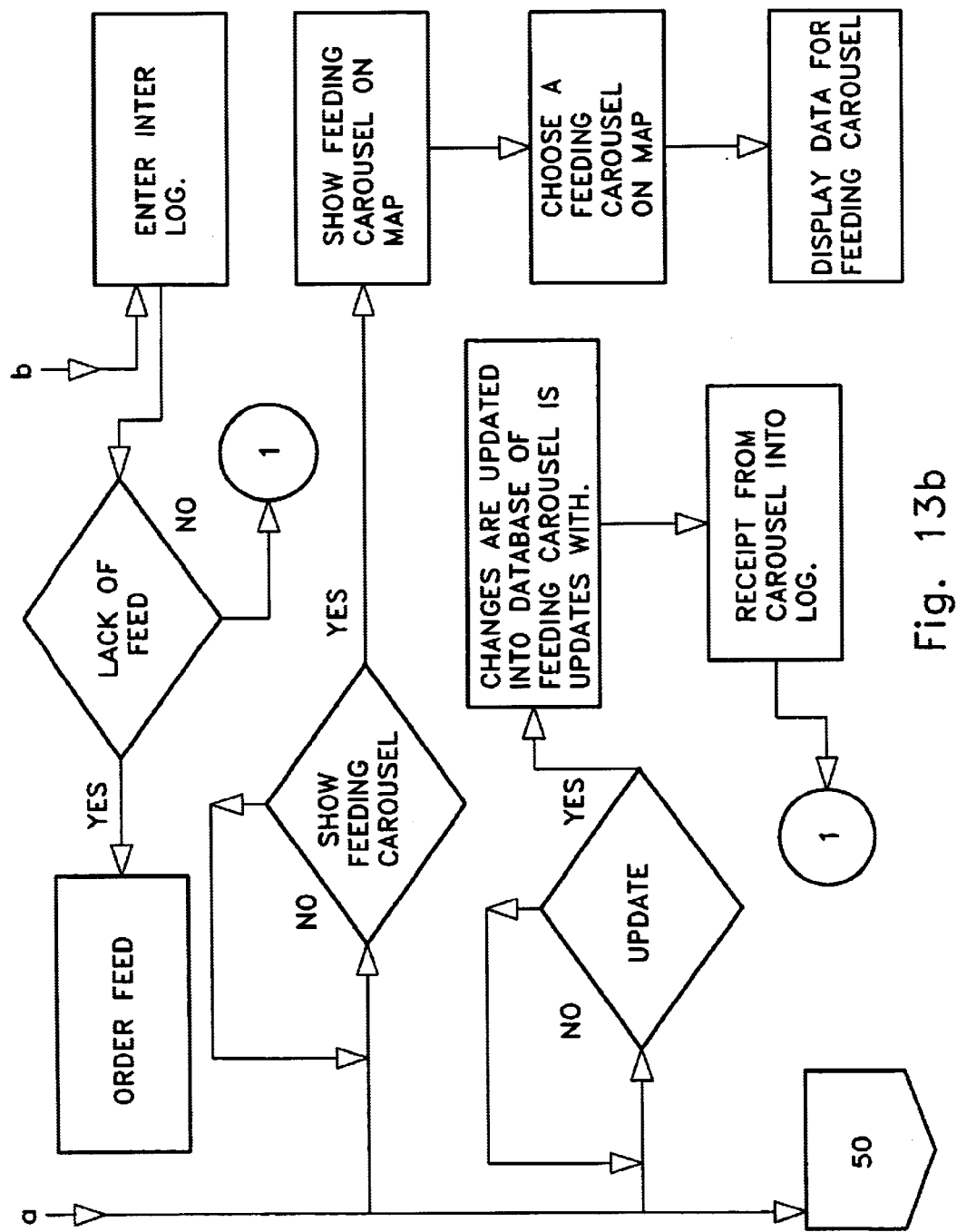
Figure 14:
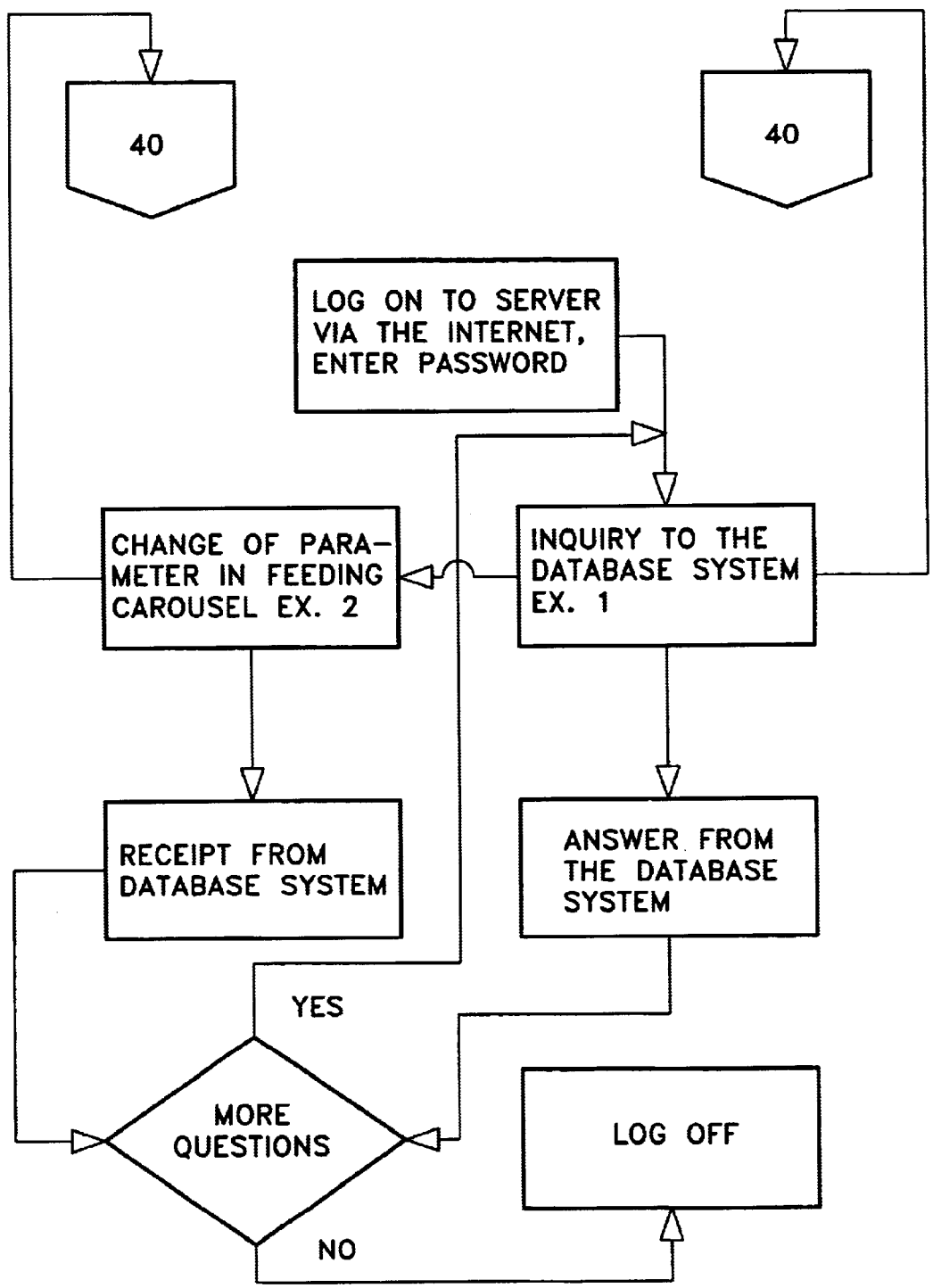
Figure 15:
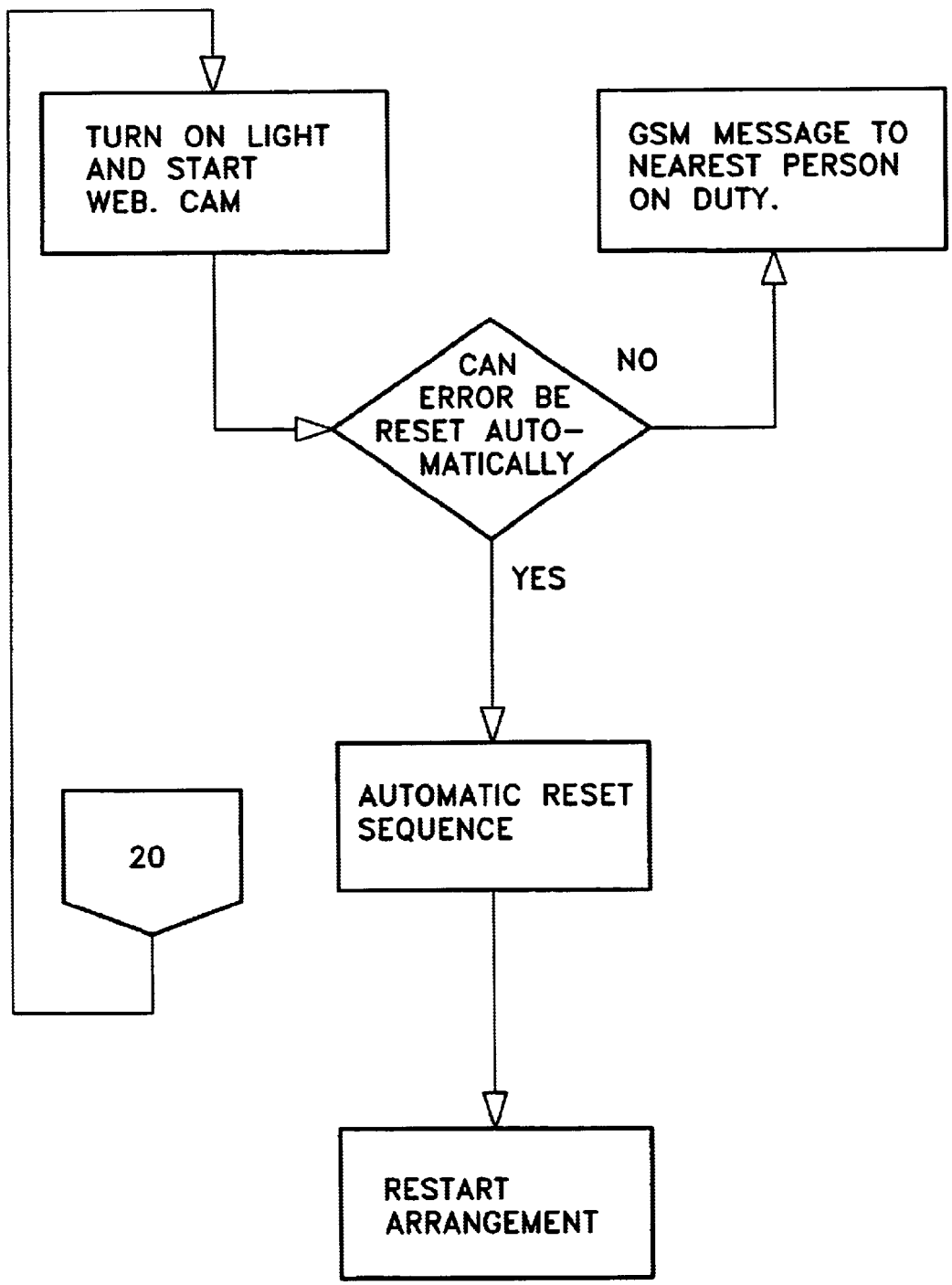
Figure 16:
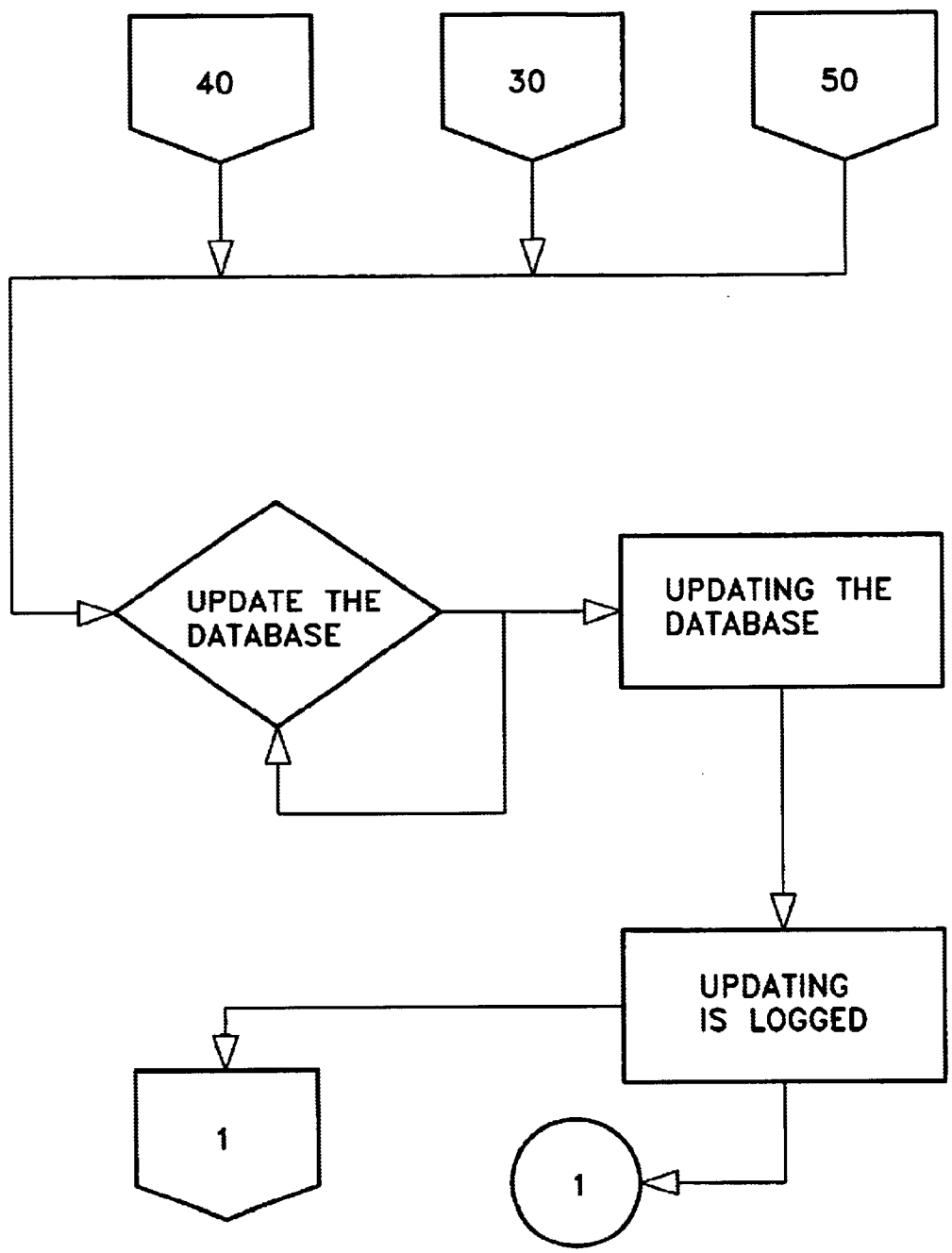
Figure 17:
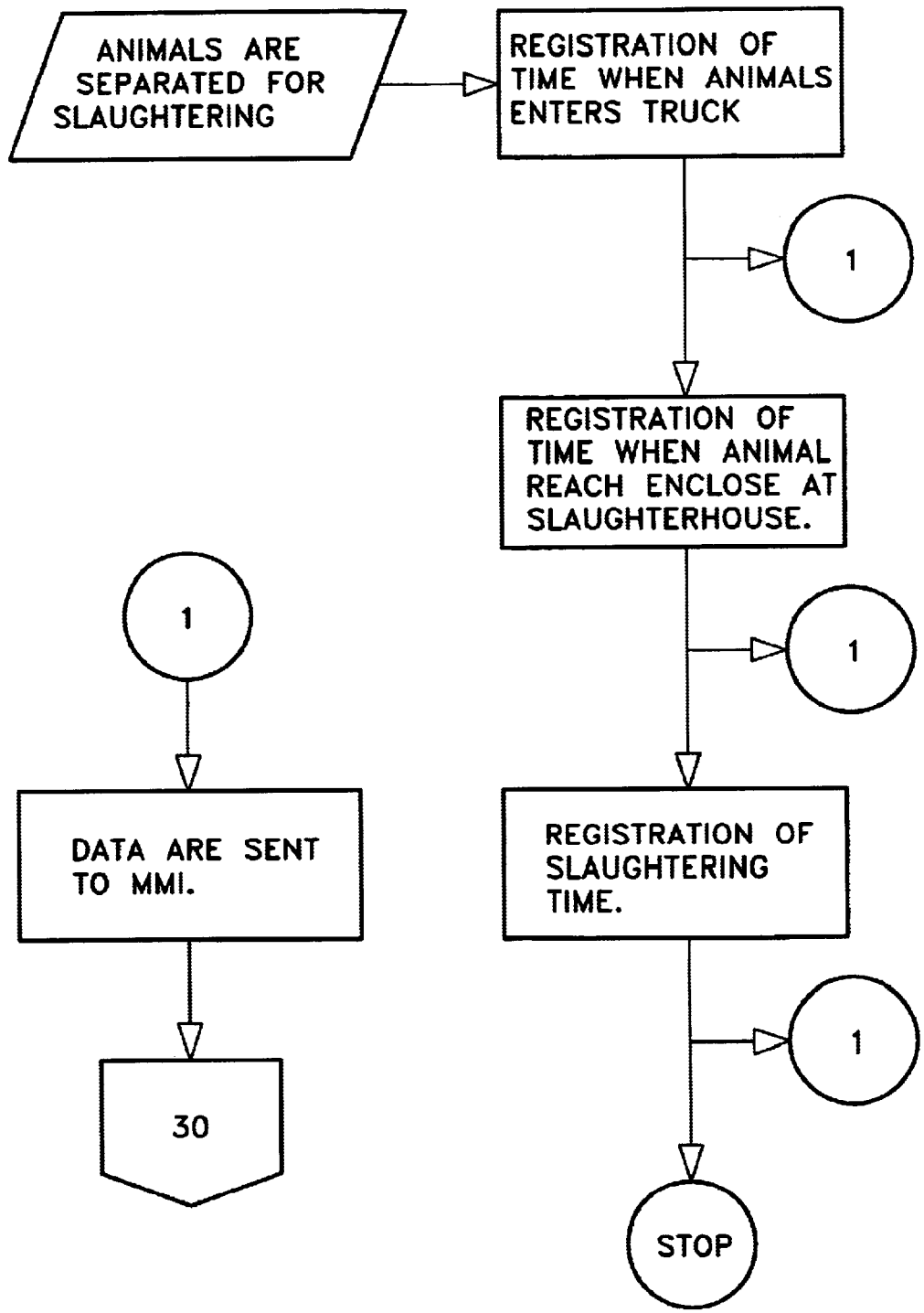
Figure 18A:
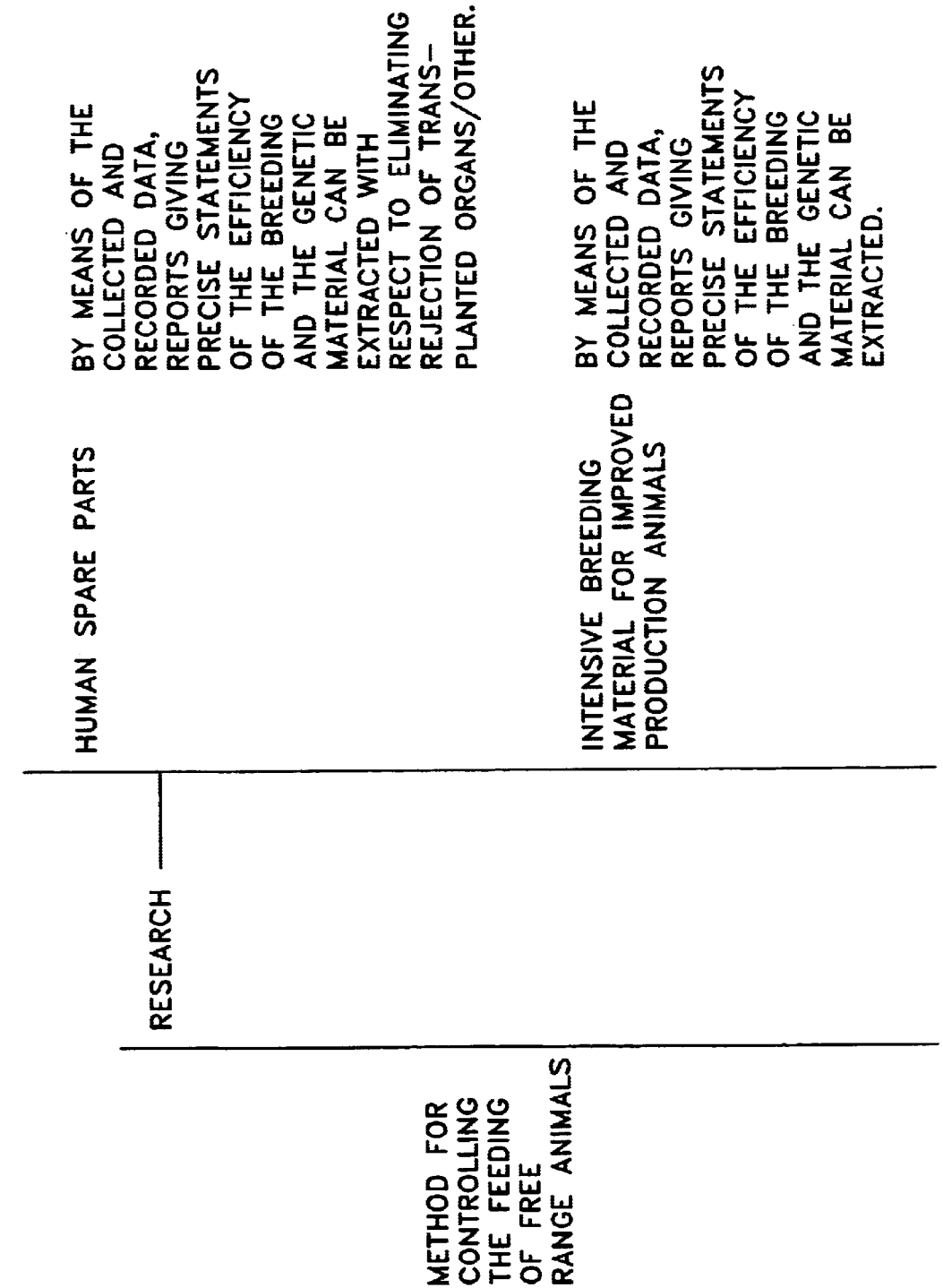
Figure 18B:
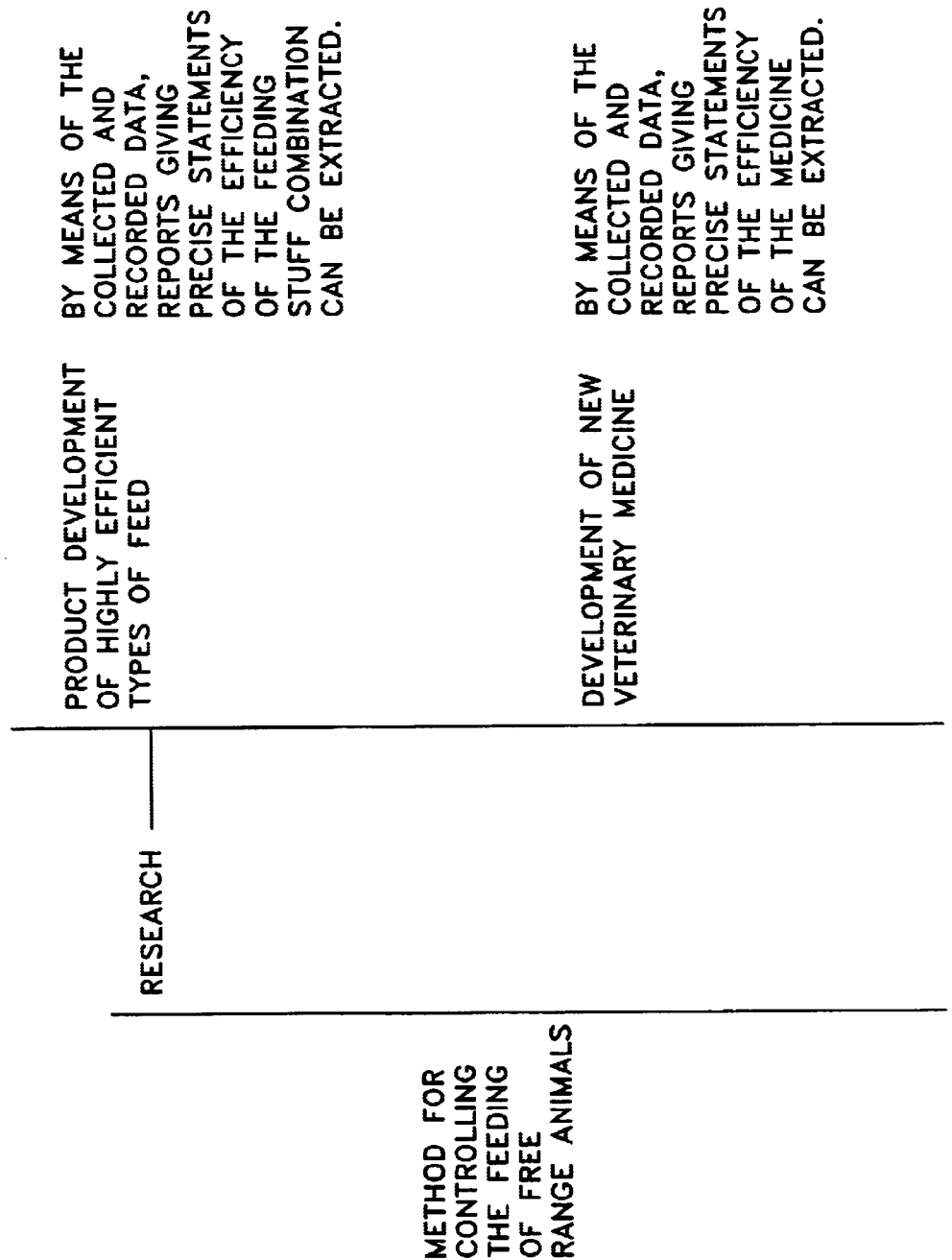
Figure 18C:
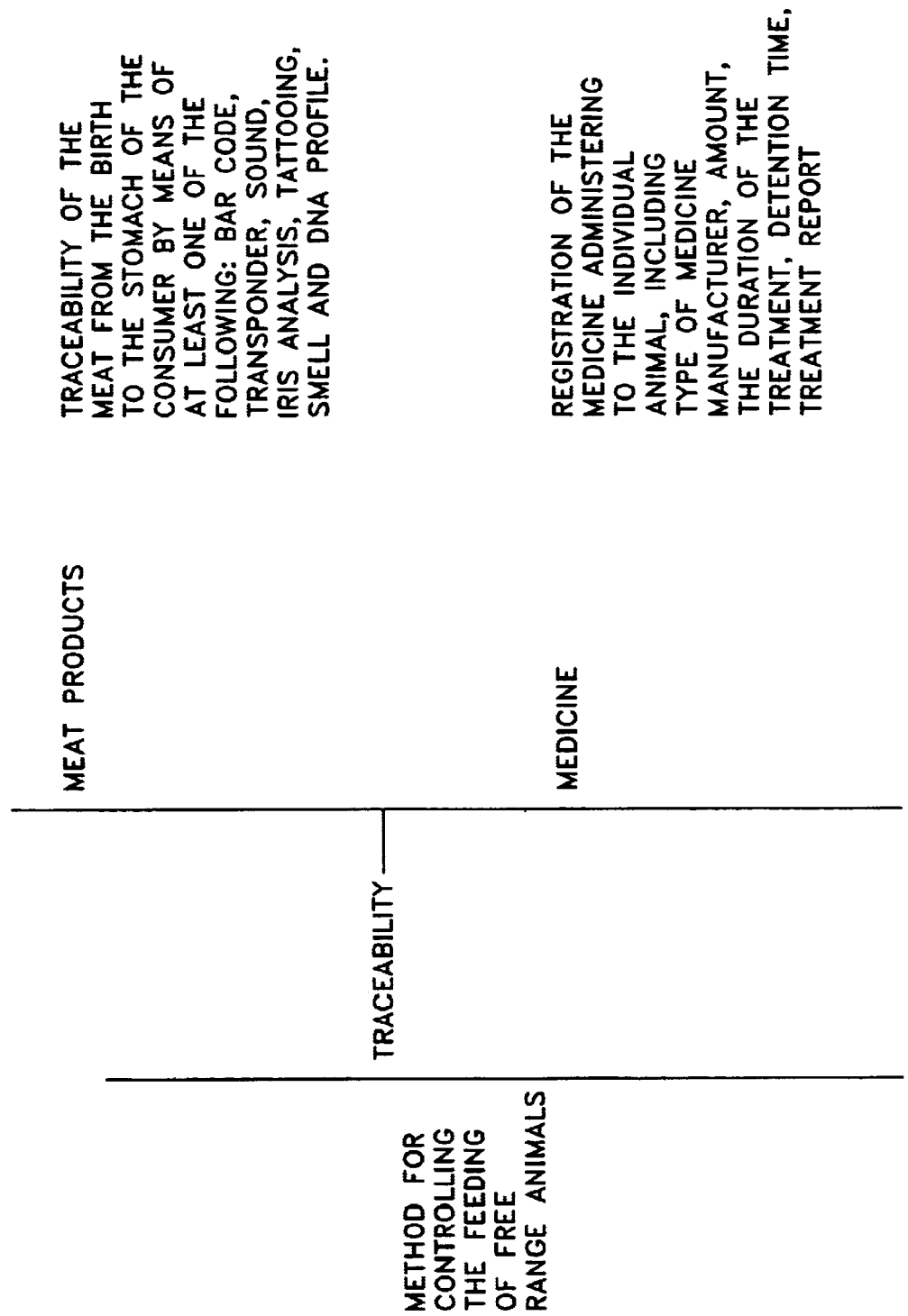

An embodiment of the present invention described in the following with reference to the figures. The embodiment is only an example in which only a part of the possible features of the present invention as discussed above are demonstrated. The embodiment is illustrated as shown in FIGS. 1–18 of which FIG. 1 shows an elevated view of an arrangement comprising separation equipment and a feeding carrousel, FIG. 2 shows the arrangement of FIG. 1 placed within a feeding hut, FIG. 3 shows a cross-section of the arrangement of FIG. 2, FIGS. 4a and 4b is a flow diagram showing the operation from the animal is to enter the feeding hut and until the animal is situated on the scale and the entrance gate is closed, FIG. 5 is a flow diagram showing the operation when the animal is situated on the scale in the inlet enclosure and identification of the animal as well as monitoring of weight, temperature, thickness of fat layer, video recording of the body, FIGS. 6a and 6b is a flow diagram showing the operation where the control unit determines whether the animal should be lead to feeding or be separated for e.g. slaughtering, due to illness, for insemination, etc., as well as feeding of the individual animal, FIG. 7 is a flow diagram showing the monitoring of gates in the equipment used in the feeding arrangement, FIG. 8 is a flow diagram showing the operation of a drinking water bowl in the feeding arrangement, wherein the water intake for each animal is monitored and a warning may be issued if the intake deviates from a standard range, FIG. 9 is a flow diagram showing the operation of video monitoring of the feeding hut including control of the illumination of the hut, FIG. 10 is a flow diagram showing the operation relating to issuing of warnings from the control unit according to input from monitoring of equipment, FIGS. 11a and 11b is a flow diagram showing the monitoring of the operation of the equipment of the feeding arrangement, FIGS. 12a and 12b is a flow diagram showing the reset procedure of the feeding carrousel, FIGS. 13a and 13b is a flow diagram showing the operations involved in remote monitoring (MMI monitoring) of a feeding carrousel, FIG. 14 is a flow diagram showing the communication between the database system of the control unit and external users, FIG. 15 is a flow diagram showing the operation of automatically reset of all functions in all positions, FIG. 16 is a flow diagram showing update of the database, FIG. 17 is a flow diagram showing the monitoring of transport, waiting time and slaughtering time, and FIGS. 18a, 18b, 18c, 18d, 18e, and 18f is a fish-bone diagram providing an overview of the method according to the present invention.

The flow diagrams FIGS. 4–17 relates to operations controlled by means of the control means of the arrangement. The numbers given at different positions in the flow diagrams, such as "40" in FIG. 14 refer to a corresponding number positioned on a different flow diagram, in this case in FIG. 16, at which position the operation continues. The method of the present embodiment according to the present invention is carried out according to the flow diagrams by means of a Personal Computer having the necessary equipment and a suitable computer program installed thereon to perform the required operations.

DETAILED DESCRIPTION OF AN EMBODIMENT OF THE INVENTION

The arrangement given as an example of an embodiment according to the invention comprises separation equipment having a transceiver 1 for communicating with transponders in the earmarks of each of the animals for identification of the individual animals, an inlet gate 2 that is opened for an animal if the identification made by means of the transceiver 1 indicates that the animal should be fed, a scale 3 for determining the weight of the animal that have entered the separation enclosure defined by the gates 2, 67 7, and the fence 8, a second transceiver 4 for verifying the identification of the animal, a first outlet gate 6 for providing access to the feeding carrousel 9 and a second outlet gate 7 for separating individual animals from the rest of the herd. Furthermore, the arrangement is equipped with an infra red sensor (not shown) for detecting the temperature of the skin of the animal that has entered the equipment and for communicating the measured value to a control unit.

The feeding carrousel 9 is divided with fences 10 into eight parts of a suitable size for accommodating an animal, each part comprising a feeding bowl 11 with supply for feed and optionally drinking water. The carrousel 9 on the figure is turning counter-clockwise with a typical rotational speed of about four turns per hour so that an animal will have seven eighths of a quarter of an hour (about thirteen minutes) to eat but the rotational speed is adjustable. The carrousel 9 is supported by a conical ball bearing as manufactured e.g. by Jost (Neuisenburg, Germany). The carrousel 9 is surrounded by a stationary fence 12 that covers most of the circumference of the carrousel 9 except at the gate 6 leading to the carrousel 9 and to the left of the gate 6 at the outlet position 13 where the animals are leaving the carrousel 9. An arm 14 is provided for expelling the animals from the part being at the outlet position 13. The arm 14 is slightly curving in the horizontal plane so at so prevent the animal from being wedged or squeezed. The fences 10 dividing the carrousel 9 and the arm 14 are formed from slats arranged so that the fences 10 may pass the arm 14, as being apparent from FIG. 3. The shown arm 14 comprises four slats but the arm 14 according to the invention comprises at least one slat and the fences have a opening defined therein for being able to pass the arm 14. The number of slats on the arm 14 and their shape and vertical position depends on the kind of animals to be fed in the arrangement.

The arm 14 may alternatively be mounted on the centre part of the carrousel 9 or it may be constructed as a turntable with approximately the same diameter as the carrousel 9 and turning in the same direction just above the floor of the carrousel 9. The centre of the turntable is situated just outside the perimeter of the carrousel 9 so that the animal are forced to jump onto the turntable which turns the animal and move it out from the part of the carrousel 9. The arm 14 is in an alternative embodiment replaced by a pushing member mounted on an air cylinder so that it may move along a radial to the carrousel 9 from the centre so as to push the animal from the part being at the outlet position 13, which may be combined with a turnable part of the floor in the part of the carrousel 9 that turns the animal within the part of the carrousel 9 a half-turn so that it is facing the periphery of the carrousel 9 before it is expelled. According to another alternative embodiment, the arm 14 is replaced by an air cylinder that lifts the inner end of a section of the floor of the carrousel 9 covering the part being at the outlet position 13 whereas the outer end of the floor section is hinged to a frame part of the carrousel 9 near the outer periphery of the carrousel 9 so that the animal is tipped out from the part of the carrousel 9. According to yet another embodiment, the section of the floor of the carrousel 9 covering the part being at the outlet position 13 is removed with the animal positioned on it either by dragging or lifting the floor section which is replaced by a similar floor section for allowing another animal to use the part of the carrousel 9. The above alternatives may also be combined in various ways to meet the requirement of expelling the animal from the part of the carrousel 9.

The animals leave the carrousel 9 to an enclosure such as a part 15 of the feeding hut 16 as shown on FIG. 2. The animals may only leave the enclosure through a one-way door 17, thus assuring that the animals pass the feeding system in one direction.

The supply of feed to the feeding bowls 11 may be provided from a feed container 18 arranged under the ceiling of the feeding hut, the feed being led from the container 18 through an opening 19 in the lower part of the container to the feeding bowls 11. A screw conveyor 20 measures out a specified amount of feed to the individual animal that is fed from the specified feeding bowl 11. The amount of feed is for porkers typically in the range of 1.5–3.5 kg.

The arrangement has a safety system to ensure that the animals will not suffer any harm in case of a malfunction of the system. The carrousel 9 is driven by a 220 V AC electric motor having an overload protection mechanism and the safety system comprises means for detecting an increased load on the motor for driving the carrousel 9 so as to detect e.g. whether an animal has become wedged. The load on the motor may be measured from the phase shift of the motor or from a phase converter controlling the operation of the motor. Similar safety arrangements may be provided for other drive means, such as pneumatic or hydraulic motors, internal combustion engines etc. In case such an incident or another major malfunction is detected, the safety system stops the rotation of the carrousel 9 and a valve connecting a reservoir of pressurised air with a number of pneumatic cylinders is opened, causing the gates 2, 6 to open and the fences 10 dividing the carrousel 9 into parts to be raised, thus allowing the animals within the arrangement to leave it. The control system of the arrangement is permanently or temporarily connected via communication means to a surveillance system and the safety system provides a signal to the surveillance system in case of a malfunction. The arrangement may be reset from the surveillance system in case the malfunction is remotely correctable by the surveillance system.

The arrangement is used for controlled feeding of the individual animal of a free range herd. The animals are preferably pigs for which individual feeding is advantageous for both sows and porkers that are raised for meat production. Both sows and porkers are fed with different compositions and amounts of feed depending on a number of circumstances. The feeding of the sows depends on whether they are in heat, are pregnant, are nursing piglets, are about to farrow, etc. and the feeding of the porkers depends on their age and weight, the so-called phase feeding programme. The individual control of the feeding of the animals ensures that the stronger or more aggressive animals do not keep other animals of the herd from the feed, which for large herds of porkers ensures a more homogeneous distribution of size and weight of porkers of the similar age and a generally better well-being and health of the animals. The free-range herds of porkers of similar age or of mixed age are often large, comprising 100, 200 or even 500 or more animals.

The feeding arrangement is equipped with a control unit, such as a computer having a logical unit and memory means for storing data, input and output units and means for controlling the operation of the arrangement. The feeding arrangement is advantageously used together with computer software for carrying out a method for feeding the animals, the computer software being stored within the memory means and controlling the steps of the operation of the arrangement. The operation of the feeding arrangement for a herd of animals each having an earmark comprising a transponder for unique identification is described below. The operation of the control unit is controlled by the computer software.

The transceiver 1 registers that an earmark is present within the sensing distance, typically about 600 mm, of the transceiver 1 and it is determined by the control unit whether the animal is to be fed or separated, in which two cases the animal is allowed into the separation arrangement. Commonly, the animals are fed twice a day. If the animal is allowed into the separation arrangement, the inlet gate 2 is opened. When the animal has entered the enclosure and is standing on the scale 3, the second transceiver 4 registers the identity of the earmark so as to confirm the identification of the animal and to determine that the animal is placed correctly within the enclosure so that the inlet gate 2 may be closed. The weight of the animal is determined from a signal received by the control unit from the scale 3 an adjustable period, typically of about 15 seconds, after the animal has entered the scale, and the weight is entered into a record of the individual animal. The scale 3 calibrates automatically when the enclosure is empty and the scale 3 is unloaded. Optionally, the arrangement also comprises means for measuring the surface temperature of the animal by measuring the infrared radiation from the animal, and alternatively or additionally the earmark may comprise a temperature sensor and means for transferring data regarding the measured temperature to the control unit. The registration of the body temperature serves the purposes of determining whether an animal is ill or, in case of a sow, determines whether the sow is in heat. The arrangement may also comprise means for measuring the thickness of the fat layer on the back of the animals, primarily for porkers.

The control unit now determines whether the animal should be fed, in which case the outlet gate 6 to the feeding carrousel 9 is opened, or the animal should be separated due to illness, a sow being in heat, for slaughtering or for other reasons, in which case the outlet gate 7 for separation is opened. The separation arrangement may optionally comprise more than one outlet gate for separation for different reasons and purposes, or the outlet gate 7 may lead to an enclosure having a plurality of outlet gates for selective separation. The opening of the outlet gate 6 to the feeding carrousel 9 is synchronised with the angular position of the carrousel 9 so that each animal is led to an open part of the carrousel 9. The outlet gate 6 or 7 is closed and the inlet gate 2 is ready to open for another animal at a predetermined time period, e.g., 10 seconds, after the outlet gate 6, 7 is opened. The outlet gate 6, 7 does not close if the animal has not left the enclosure completely but the inlet gate 2 is opened so that the following animal will push the preceding animal out from the enclosure. The outlet gate 6, 7 is closed in response to the signal from the second transceiver 4 indicating that no earmark or other transponder is within reading distance of the transceiver 4. Alternatively, the outlet gate 6, 7 is closed in response to the output from the scale 3 indicating that the animal has left the enclosure.

Feed is provided in the feeding bowl 11 in an amount determined by the control unit by activation of the screw conveyor 20. Optionally, the arrangement comprises more than one feed container 18 and the feed may be mixed individually for each animal. Subpopulations of the animals may be fed with different types of feed in order to fulfil different requirements from different customers such as organically grown feed. Furthermore, a supply of drinking water may be provided within each part and means for dosing medicine into the feed for the individual animal may also be provided.

A record for each animal of the herd is kept within the memory means of the control unit. The record comprises the transponder identification number, an identification number, the day of birth of the animal, identification of sow and boar and weight at the age of 6–8 weeks. Optionally, the daily registered weight, temperature, amount of feed, unique identification of feed, the hour and minute of each daily feeding and/or the thickness of the layer of fat is also kept on record. For sows, data regarding expected heat, data regarding the day of insemination and day of expected farrowing and/or data regarding size of litter may also be kept on record.

A number significant of the utilisation of the feed, the E value, may be calculated as follows based on the recorded data.

$$E = \frac{\text{weight, day 2} - \text{weight, day 1}}{\text{feed consumption per day} * \text{number of days}} =$$

weight unit growth per consumed weigh unit of feed

The amount of feed for porkers is determined from a table stored within the memory means of the control unit and comprising data connecting the age, normal weight and amount and mixture of feed for the animals. If the weight of an animal deviates to the lower side from the normal weight with more than a certain percentage, e.g. 5%, the amount of feed for that particular animal is increased over a period. The lower weight may be caused by illness for which reason the effect of the increased amount of feed is monitored over a period and the animal is separated from the herd if the desired effect is not achieved. The amount of feed is in general raised for all animals if the temperature is low and/or for certain combinations of temperature and wind for animals living outdoor, because it takes more energy for the animals to keep the body temperature up. The amount of feed is typically raised with 5% due to cold weather but the amount of feed may be adjusted to more than one other level so that a more precise adaptation to the environment of the animals may be made.

The control unit is preferably connected to a surveillance system via a private or public communication network or a combination thereof. The communication between the person or persons who look after the free-range breeding arrangement and the herd of animals will most often take place via the network. The control unit may prepare operating reports to the surveillance system with a predetermined interval and/or on demand, and reports regarding malfunctions of the system are sent to the surveillance system. An operating report may comprise data regarding the individual animal and statistical data about the number of animals within a weight interval, the temperature of the animals, etc. The statistical data from the control unit may advantageously be used for optimising the raising of the porkers with regard to amount and composition of feed, compensation for change of type of feed, for monitoring the effect of changes in the physical environment of the animals, such as the huts, the area of the field, the arrangement on the field, etc. The statistical data also constitutes an important parameter in the selection of parent animals for breeding.

The separation of animals for slaughtering is typically performed by communicating the number of animals of a given weight that is desired to be separated from the herd to the control unit prior to the actual fetching of the animals, e.g. twelve hours before. Alternatively or additionally, the animals for slaughtering may be chosen due to another parameter such as the thickness of the fat layer on the back of the animal, the time period in which the separation is to take place, based on the registered habits of the animals, the E value of the animals, etc., The control unit then selects the desired number from the animals passing the separation unit and separates these animals to an enclosure provided with drinking water. The progress of the separation process may be monitored at distance via the communication network. The control unit corrects the records on the herd after the animals for slaughtering have been fetched and the data regarding the separated animals may be transferred to the surveillance system so that the data may follow the animals/the meat, optionally all the way to the consumer. In an alternative approach, information is requested from the control unit regarding how many animals of a given size that may be separated within a given time period and the number is predicted based on the registration of the habits of the individual animal. A list of the animals chosen for separation may be supplied from the control unit to the user for manually editing of the list a returning it to the control unit.

A separation command given to the control unit could as an example comprise:
the breeding unit within a larger system from which the animals should be selected,
the feeding unit(s) within the breeding unit to separate from,
the number of animals,
the time period in which the animals should be separated,
the date on which the separation should take place,
the weight range of the animals,
the thickness range of the fat layer on the back of the animals, the upper limit of the registered temperatures of the animal within a given time range,
the outlet to which the animals should be separated.

The control unit may also be connected with equipment for providing pictures and/or sound from one or more locations of the breeding system and in particular for the separation and feeding arrangement and for transferring these recordings to the surveillance system.

Another function of the system is to optimise the feeding of the individual animals in order to reach a given set of criteria at a given time. Typically, a previously placed order defines a common set of criteria for a given number of animals and a time of delivery, the criteria comprising e.g. a weight range and a thickness of the fat layer on the back of the animals. The animals are weighted and the thickness of the fat layer is measured at least once each day and the composition of the feed for the individual animal is adjusted to reach these criteria. The feed is mixed from a number of different types of feed having different content of protein, filling material with less nutritional value, vitamins, etc.

The feeding of the animals is reduced the last three days before separation of slaughtering so that the animals are delivered to the slaughterhouse with less filled intestines so that contamination of meat and equipment is reduced.

The method of the present invention is performed by means of a Personal Computer having a central processing unit (CPU), random access memory (RAM), a permanent storage medium being a hard disc, communication means to communicate with external sensors etc. and a connection to a public data communication network through which it may establish connection with the remote surveillance system.

The detailed monitoring of the feeding of the animals including registration of the identity of the consumed feed makes it possible to establish a link from an animal or a product derived from the animal, such as meat, to an identified source of feed. Likewise, a known source of feed that e.g. have shown to contain unwanted components, impurities or pollution can be linked to animals or products derived from animals that have been fed the feed in question.

The linking may be extended to link feed consumed by a dam, such as a sow, during pregnancy with the individual animals of the litter.

The process of registration starts with the control unit of the breeding system issuing an order of delivery of feed to the surveillance system. The issuance of the order is based on measurements of the level of feed in the feed storage silos of the breeding system in question. Alternatively, the order is based on a calculation of the feed consumption from the amount of feed dispersed to the animals. The amount of feed dispersed may, in order to obtain a more precise measure, for each feeding of each animal be weighed and the weight be registered. The surveillance system forwards an electronic delivery order by electronic mail to a supplier business concerning the type of feed, the amount, place and date of delivery etc. The supplier business replies by electronic mail with a confirmation of the delivery order, a reference number uniquely identifying the feed and a declaration of the content of the feed. When the feed is delivered from the supplier, a test sample of 3 kg of the feed is deposited for permit a possible later analysis of the content of the feed. Every time an animal within the breeding system is fed, the reference number of the feed is registered in the record of the animal together with the amount consumed by the animal.

In the case of breeding of porkers, the animals are separated automatically from the herd when ready for slaughtering. The porkers are equipped with an earmark in each ear having identical transceivers so that the two half carcasses of the slaughtered animal each can be uniquely identified. Each larger piece of meat that is cut off the carcass is being equipped with a machine-readable identification mark, a barcode or preferably a transponder, when it is packed and the identification mark is in a database linked to the identity of the animal obtained from the earmark. Alternatively or as a supplement, the DNA profile of the animal can be used to identify the meat.

A customer in a retail store distributing the meat may now from a computer in the store having means for reading the identification mark be able to obtain information about the feed the animal have been fed, such as e.g. a possible content of genetically modified plant products, animal products such as meat-and-bone meal, plant products that have been treated with pesticides or straw-shortening agents, etc., or e.g. whether and to which extend the feed was organically grown, is guaranteed not to be contaminated by plant diseases, such as fungal attacks, etc. The data are preferably obtained by means of a data communication connection between said store computer and the computer of the remote surveillance system or another central computer system holding the relevant information from the breeding system and the slaughterhouse.

Another important use of the linkage between products and feed is the case of a possible content of an unwanted component in a piece of meat, such as e.g. dioxin, PCB etc. If it is found that a piece of meat contains animal dioxin at a level beyond the limit value. The identification mark of the piece of meat is used to identify the animal and the record of the animal within the control unit of the breeding system is used to identify the sources of feed. An analysis of the deposited test samples does not reveal a content of dioxin, and the data of the record is used to identify the mother of the animal and the feed she consumed during the pregnancy. An analysis of the relevant samples reveals that the sow from day 58 to day 93 of the pregnancy has consumed feed having a content of animal dioxin. As a result, all animals that have consumed the polluted feed, directly or indirectly, can be identified and the meat can be destroyed. This is highly advantageous as compared to the situation of today in which it is necessary to destroy huge amounts of meat that might be polluted, or alternatively do nothing.

For this use the DNA profile of the animal may be advantageous to use to identify products derived from an animal because it may be used to analyse the products in any state, e.g. from manufactured products or even from the stomach content of a person.

The use of the DNA profile may comprise that a tissue sample is taken from the animal within the first 24 hours after birth, a DNA profile is prepared by means of a kit in which the sample is given a unique number being the same ID number as that of the ear tags applied to the animal in order to minimise the risk of exchange by mistake. The profile data are entered into the record pertaining to the animal and the data may be used for searched among the records. The DNA profile may be used to identify and trace products derived from the animal and link these to the feed consumed by the animals.

What is claimed is:

1. Method for controlling breeding of animals of a herd comprising selecting by means of a control unit a subgroup of animals from the herd and determining a weight range from which the weight of each of the selected animals should not deviate at a selected future date, the method further comprising for each animal of the selected subgroup the repeated series of steps of monitoring the weight of each individual animal by regular, automatic detection of the weight by means of weighing means controlled by means of a control unit to which the weighing means communicates an output signal being significant for the detected weight, the detection being accompanied by an automatic identification of the individual animal by means of identification means controlled by means of the control unit to which an output significant of the identity of the animal is communicated from the identification means, adding said output from the weighing means into a record pertaining to the individual animal, the record being selected by the control unit from a plurality of records comprised within a data storage means of said control unit by use of the output from the identification on means, and storing of said record in the data storage means by means of said control unit, computing by means of the control unit a feed ration for each individual animal based on data comprised within the record pertaining to said animal, on the selected weight range, and on the selected date, controlling an automatic feeding unit by means of the control unit, wherein each individual animal in automatically identified by means of identification means controlled by means of the control unit and the computed feed ration for the individual animal a dispersed to the animal by means of feed dispersing means controlled by means of the control unit, and adding data concerning the feeding of the individual animal to the record pertaining to said animal.

2. Method according to claim 1, and further comprising the step of receiving by means of the control unit a separation order comprising data relating to the number of animals to be separated, to a weight range from which the weight of each of the selected animals should not deviate upon separation, and to a future date of separation, performing said selection of a subgroup in accordance with the received separation order, and performing by means of separation means controlled by the control unit a separation from the remaining herd of the selected subgroup of animals on said date of separation.

3. Method according to claim 1 comprising for each animal the repeated series of steps of automatic identification of an individual animal by means of identification means controlled by means of a control unit to which an output significant of the identity of the animal is communicated from the identification means, dispersing feed to the identified animal by means of feed dispersing means of an automatic feeding unit controlled by means of the control unit, and adding data concerning the feeding of the identified animal to a record pertaining to said animal and storing said record on data storage means associated with the control unit, the data concerning the feeding of the identified animal comprises data suitable for unique identification of the batch/batches of feed from which the feed dispersed to the animal is taken.

4. Method according to claim 3 comprising the steps of identifying from said records which batches a given animal have consumed feed from, retrieving from data storage means information about the constituents of each of the batches of feed from which a given animal have consumed feed from, and producing an output accordingly.

5. Method according to claim 3 comprising the steps of identifying from a unique identification of a batch of feed the animals of the herd which have consumed feed from said batch, and producing an output accordingly.

6. Method according to any of claim 3, wherein the data suitable for unique identification of the batch/batches of feed from which the feed dispersed to the animal is taken are being added to a record pertaining to the identified animal for substantially all food being fed to the animal during a period corresponding substantially to the lifetime of the animal and substantially all of the data added to the record pertaining to each of the animals are kept in the record at least during said period.

7. Method according to claim 6, wherein each record pertaining to an individual animal of the herd comprises data relating to the identity of the mother of the individual animal, said data being suitable for enabling unique identification of the batch/batches of feed from which the feed dispersed to the mother during the pregnancy period to be retrieved.

8. Method according to any of claim 3, further comprising the steps of determining by means of product identification means a unique animal identification of products derived from animals of the herd, and searching and retrieving from data storage means a record pertaining to the animal from which the product was derived in accordance with the determined unique animal identification, the record comprising data suitable for unique identification of batches of feed from which feed dispersed to the animal have been taken.

9. Method according to claim 3, further comprising the steps of determining unique animal identification data by means of analysing the DNA of a sample taken from an animal of the herd or from a product derived from an animal from the herd, and searching and retrieving from data storage means a record pertaining to the animal in accordance with the determined unique animal identification data, the record comprising data suitable for unique identification of batches of feed from which feed dispersed the animal have been taken.

10. Method according to claim 1, wherein said data concerning feeding of the individual animal comprises data concerning the time at which the animal is fed.

11. Method according to claim 1, comprising the steps of monitoring characteristics of each individual animal by regularly, automatically detection of said characteristics by means of detection means controlled by means of the control unit to which the detection means communicate an output signal being significant for the detected characteristics, the detection being accompanied by an automatic identification of the individual animal by means of identification means controlled by means of the control unit to which an output significant of the identity of the animal is communicated from the identification means, said characteristics comprising at least the weight of the animal, and adding said output from the detection means into the record pertaining to the individual animal and storing of said record in the data storage means by means of the control unit.

12. Method according to claim 11, wherein the step of monitoring characteristics of each identified animal comprises the monitoring of at least one of the following characteristics;

a) a temperature of the animal, b) a thickness of the fat layer on the back of the animal, and c) an image representing at least a part of the body of the animal, the at least one characteristics being detected by suitable detection means controlled by means of the control unit to which the detection means communicates an output signal being significant for the detected characteristics, the method further comprising the step of adding said output from the detection means into the record pertaining to the identified animal.

13. Method according to claim 11, wherein the step of monitoring characteristics of each identified animal comprises the monitoring of at least one of the following characteristics relating to the stress level of the animal:

d) the respiration rate of the animal, e) the heart beat rate of the animal, t) the blood pressure of the animal, and g) an image of an eye of the animal, the at least one characteristics being detected by suitable detection means controlled by means of the control unit to which the detection means communicates an output signal being significant for the detected characteristics, the method further comprising the step of comparison of the output signal with a standard value of said output comprised within the storage means by means of the control unit and the step of adding the outcome of said comparison into the record pertaining to the identified animal.

14. Method according to claim 13, wherein said standard value of said output for each of the animals is comprised within the record pertaining to the animal.

15. Method according to claim 12, wherein a temperature of each animal is monitored, the method further comprising the steps of determining whether the detected temperature deviates from a predetermined reference temperature range by means of the control unit, and separating the animal by means of a separation unit controlled by means of the control unit in case of deviation.

16. Method according to claim 1, wherein the computed feed ration comprises a mixture of at least two types of feed and the feed dispersing means disperses said mixture.

17. Method according to claim 1, wherein the feeding unit comprises detection means for detecting a possible amount of feed that was not consumed by the animal to which it was dispersed and for communicating data being significant of said amount to the control unit, said data being added to the record pertaining to said animal.

18. Method according to claim 1 and further comprising the step of
on a regular basis computing the E value, being the weight unit growth per consumed weight unit of feed, for each animal by means of the control unit using data comprised within the record pertaining to the animal.

19. Method according to claim 18 and further comprising the steps of
determining for each animal whether the computed E value deviates from a predetermined set of E value ranges by means of the control unit, and
separating the animal by means of a separation unit controlled by means of the control unit in case of deviation.

20. Method according to claim 17 and further comprising the steps of
determining for each animal whether the consumed amount of feed deviates from a predetermined set of feed consumption ranges by means of the control unit using data comprised within the record pertaining to the animal, and
separating the animal by means of a separation unit controlled by means of the control unit in case of deviation.

21. Method according to claim 1, wherein the feed ration for each animal is adjusted by means of the control unit according to the temperature and optionally to the wind speed the animals are subjected to.

22. Method according to claim 1 wherein said step of selecting by means of the control unit a subgroup of animals from the heard comprises the step of selecting a subgroup based on data comprised within the records of each animal and on a set of selection data comprised in the data storage means, and
controlling an automatic separation unit by means of the control unit, wherein each animal belonging to said subgroup is automatically identified by means of identification means controlled by means of the control unit and is separated to a separation enclosure.

23. Method according to claim 1 and further comprising the step of issuing a warning information requesting external interaction by means of the control unit in case at least one condition of a list of conditions is fulfilled, the list of conditions comprising at least the following conditions:
a) at least one of the animals has not entered a feeding unit within a predetermined time period, and
b) the power supply to a breeding system controlled by the control unit is interrupted.
b) the power supply to a breeding system controlled by the control unit is interrupted.

24. Method according to claim 23, wherein the feeding unit comprises feed storage means and monitoring means for monitoring the content of the storage means and communicating to the control unit accordingly, the list of conditions further comprising the condition of:

c) the remaining supply of feed in the feed storage means is below a predetermined threshold value.

25. Method according to claim 23, wherein the list of conditions further comprises at least one of the following conditions:
d) the pressure in the supply of compressed air to the breeding system is below a predetermined threshold value,
e) the pressure in the supply of drinking water to the breeding system is below a predetermined threshold value, and
f) a malfunction of one of the elements of the breeding system being controlled by means of the control unit is detected.

26. Method according to claim 23, wherein the list of conditions further comprises the condition of:
g) at least one of the animals has not approached a drinking water bowl within a predetermined time period.

27. Method according to claim 1, wherein the control of the feeding unit further comprises the step of controlling medicine dispersing means of the feeding unit in accordance with medicine dispersing data stored within the record pertaining to the identified animal in the feeding unit so that the animal is being provided with a predetermined ration of medicine, and wherein the data concerning the dispersing of medicine is added to said record.

28. Method according to claim 1, wherein said step of selecting a subgroup comprises the step of selecting a subgroup in accordance with a separation order communicated to the control unit, the separation order comprising data relating to the number of animals to be separated and to at least one quality to be fulfilled by the selected animals, the at least one quality being selected from a list of qualities comprising the following quality:
a) a weight range from which the weight of each of the selected animals do not deviate.

29. Method according to claim 28, wherein the list of qualities further comprises the following quality:
b) a predetermined time period in which medicine has not been dispersed to any of the selected animals.

30. Method according to claim 28, wherein a thickness of the fat layer on the back of the animal is monitored, the list of qualities further comprises the following quality:
c) a thickness range from which the thickness of the fat layer on the back of the selected animals should not deviate.

31. Method according to claim 28, wherein the list of qualities further comprises the following quality:
d) a set of E value ranges from which the set of computed E values of the selected animals should not deviate.

32. Method according to claim 10, wherein a separation of animals is performed in relation to the feeding, the separation order further comprises data relating to the time at which the separation following the selection is to be accomplished, the separation of animals being performed with consideration to data relating to the times at which the animal is fed comprised in the record of each animal.

33. Method according to claim 1, wherein animals that are separated for slaughtering are identified and monitored through the procedure of separation, transport to the place of slaughtering and the slaughtering process itself so that each of the individual animals are monitored a plurality of times during said procedure and data resulting from said monitoring are added to the records pertaining to the respective animals.

34. Method according to claim 1, wherein each of the records further comprises data relating to the identity of the parents of the animal and to the date of birth.

35. Method according to claim 1, wherein the breeding arrangement controlled by use of the method comprises a mud-hole arranged accessible for the animals, the mud-hole having such dimensions that it may contain at least one of said animals and having a design so that said animals are able to enter and leave the mudhole, the mud-hole comprising detection means for detecting the relative content of excretions in a liquid contained within the mud-hole and communicating an output accordingly to the control unit, the control unit comparing the output with a predetermined range stored within the storage means and issuing a warning in case the output deviates from said range.

36. Method according to claim 1, wherein the control unit is at least temporarily connected to a data communication network via which it is able to communicate with at least one remote system.

37. Method according to claim 36, wherein the remote system is a surveillance system from which the operation of the control unit may be remotely monitored and at least partially controlled.

38. Method according to claim 23, wherein the warning information is issued to a remote system by means of the data communication network.

39. Method according to claim 1, further comprising for each animal the repeated series of steps of automatic identification of an individual animal approaching a drinking water bowl by means of identification means of the drinking bowl controlled by means of the control unit to which an output significant of the identity of the animal is communicated from the identification means, monitoring of the amount of water consumed by said animal from the drinking water bowl by means of detection means and communicating an output accordingly to the control unit, and adding said data to the record pertaining to said animal, the animals of the herd being supplied with drinking water from one or more drinking water bowls controlled in the above way so that all consumption of drinking water of each of the animals is monitored and data concerning said consumption are added to the record of each animal.

40. Method according to claim 39 and further comprising the steps of determining for each animal whether the consumed amount of water deviates from a predetermined set of water consumption ranges by means of the control unit using data comprised within the record pertaining to the animal, and separating the animal by means of the separation unit in case of deviation.

41. Method according to claim 40, wherein the step of separation of the animal is accompanied by the issuance of warning information by means of the control unit.

42. Method according to claim 1 comprising for each animal the repeated series of steps of detecting by means of electronic image recording means an electronic image being significant of a possible amount of feed that was not consumed by the animal to which it was dispersed and processing said image by means of data processing means to determine said possible amount, and adding data concerning the feeding of the identified animal, including said determined possible amount, to a record pertaining to said animal and storing said record on data storage means associated with the control unit.

43. Method for remote surveillance of a plurality of breeding systems each for automatic breeding of animals of a separate herd by means of a central surveillance computer system in accordance with the method of claim 1, the method comprises for each of the breeding systems the steps of performing a continuous monitoring of the operation of at least parts of the 5 breeding system by means of the control unit, and at least temporarily establishing a data communication connection between the control unit and the central surveillance computer system via a data communication network, the method further comprising the steps of comparing the collected data relating to the animals of each of the herds and to the monitoring of the operation of each of the plurality of breeding systems with a set of standard data defining an envelope of normal operation and issuing by means of the central surveillance computer a warning message comprising a request for human interaction with a specified one of the plurality of breeding systems.

* * * * *